(12) United States Patent
Cates et al.

(10) Patent No.: US 8,438,037 B2
(45) Date of Patent: May 7, 2013

(54) EMOTIVITY AND VOCALITY MEASUREMENT

(75) Inventors: Thomas M. Cates, Acton, MA (US); Eli M. Blatt, San Francisco, CA (US)

(73) Assignee: Thomas M. Cates, Acton, MA (US)

( * ) Notice: Subject to any disclaimer, the term of this patent is extended or adjusted under 35 U.S.C. 154(b) by 386 days.

(21) Appl. No.: 12/758,349

(22) Filed: Apr. 12, 2010

(65) Prior Publication Data

US 2011/0077988 A1 Mar. 31, 2011

Related U.S. Application Data

(60) Provisional application No. 61/168,618, filed on Apr. 12, 2009.

(51) Int. Cl.
*G06Q 10/00* (2012.01)

(52) U.S. Cl.
USPC .......................................................... 705/1.1

(58) Field of Classification Search ................ 705/1
See application file for complete search history.

(56) References Cited

U.S. PATENT DOCUMENTS

| | | | |
|---|---|---|---|
| 5,566,392 | A | 10/1996 | Dzelzkalns |
| 6,510,427 | B1 | 1/2003 | Bossemeyer et al. |
| 6,876,990 | B2 | 4/2005 | Yamanishi et al. |
| 6,915,270 | B1 | 7/2005 | Young |
| 6,928,392 | B2 | 8/2005 | Nickerson et al. |
| 7,370,285 | B1 | 5/2008 | Nickerson et al. |
| 2003/0009373 | A1 | 1/2003 | Ensing |
| 2003/0130983 | A1 | 7/2003 | Rebane |
| 2004/0177138 | A1 | 9/2004 | Salle et al. |
| 2004/0249650 | A1* | 12/2004 | Freedman et al. ................. 705/1 |
| 2005/0091077 | A1 | 4/2005 | Reynolds |
| 2005/0119931 | A1 | 6/2005 | Schall |
| 2006/0041548 | A1 | 2/2006 | Parsons |
| 2006/0100897 | A1 | 5/2006 | Halloran |
| 2007/0156515 | A1 | 7/2007 | Hasselback |
| 2007/0208569 | A1 | 9/2007 | Subramanian et al. |

(Continued)

FOREIGN PATENT DOCUMENTS

| | | |
|---|---|---|
| JP | 2004-227343 A | 8/2004 |
| JP | 2005-322239 A | 11/2005 |

(Continued)

OTHER PUBLICATIONS

Brookeside, "Creating Loyalty at the Source", Brookeside Ventures Inc., 2001-2009, 4 pages.

(Continued)

*Primary Examiner* — Jonathan Ouellette
(74) *Attorney, Agent, or Firm* — Robert Plotkin, P.C.

(57) ABSTRACT

One embodiment of the present invention is directed to a computer-implemented system that analyzes free-form text comments provided by a user (such as a customer of a company) and draws conclusions about the tone of the user's feedback, such as whether the user's feedback is positive, negative, angry, critical, or congratulatory. Such conclusions may be reflected in a single numerical value referred to herein as "emotivity." A customer's emotivity score may be used for various purposes, such as determining whether the customer is likely to provide a positive testimonial for the company, or whether a follow-up phone call should be made to the customer to improve the company's relationship with the customer. Furthermore, a measurement of the customer's loyalty to the company may be modified based on the user's measured emotivity.

48 Claims, 12 Drawing Sheets

U.S. PATENT DOCUMENTS

| | | |
|---|---|---|
| 2007/0271111 A1 | 11/2007 | Dubinsky |
| 2008/0021750 A1 | 1/2008 | Masuyama |
| 2008/0065471 A1 | 3/2008 | Reynolds |
| 2010/0185564 A1* | 7/2010 | King et al. ............ 705/500 |
| 2010/0191581 A1 | 7/2010 | Furin |

FOREIGN PATENT DOCUMENTS

| | | |
|---|---|---|
| JP | 2006-302107 A | 11/2006 |
| JP | 2007-141202 A | 6/2007 |
| KR | 100838688 B1 | 6/2008 |
| WO | 20100019433 | 5/2010 |

OTHER PUBLICATIONS

Cates, Thomas M., "Welcome toThe Age of Great Business Relationships", How to Create Long-term, Mutually Beneficial Relationships With Your Most Important Customers & Business Partners, Brookeside, Presented by The Brookeside Group, Inc., Copyright 2004, 20 pages.

F. Reichheld, "The Loyalty Effect," Chapters 1, 4, 5, 7, and 8 (Boston: Harvard Business School Press, 1996).

F. Reichheld, "The Ultimate Question: Driving Good Profits and True Growth," Chapters 2 and 4 {Boston: Harvard Business School Press, 2006).

G. Litwin and R. Stringer, "Motivation and Organizational Climate," Chapters 2-6 (Boston: Harvard University Press, 1968).

K. Lerman and M. Austin, "What Companies Gain from Listening," Communispace Corporation, Watertown, MA, 2006.

L. Weber, "Marketing to the Social Web—How Digital Customer Communities Build Your Business," Chapter 4 (New Jersey: John Wiley & Sons, Inc., 2007).

McClelland, David C, "How motives, skills, and values determine what people do," PsycNET—Display Record, American Phycological Association, American Psychologist. vol. 40, No. 7, Jul. 1985, pp. 812-815 (Only Abstract submitted).

R. Stringer, "Leadership and Organizational Climate," Chapters, 1-7 and 11 (Upper Saddle River, NJ: Prentice-Hall, 2002).

Raven et al., "The McClelland/McBer Competency Models", Chapter 15, Competence in the Learning Society, New York, Peter Lang, 2001, 10 pages.

* cited by examiner

EMOTIVITY AND VOCALITY MEASUREMENT

CROSS REFERENCE TO RELATED APPLICATIONS

This application claims priority from co-pending and commonly-owned U.S. Prov. Pat. App. Ser. No. 61/168,618, filed on Apr. 12, 2009, entitled, "Emotivity and Vocality Measurement," which is hereby incorporated by reference herein.

This application is related to co-pending and commonly-owned U.S. patent application Ser. No. 12/535,682, filed on Aug. 5, 2009, entitled, "Loyalty Measurement," which is hereby incorporated by reference herein.

BACKGROUND

All businesses desire to increase the loyalty of their customers because it is well-recognized that increasing loyalty leads to increased profits. Most businesses, however, find increased customer loyalty to be an elusive goal. It is difficult to increase loyalty in a business or other relationship not only because it can be challenging to identify the concrete actions that need to be taken to increase such loyalty, but also because it can be difficult even to measure the current loyalty of a customer or other party to the relationship. Failure to obtain a concrete and objective measurement of current loyalty will almost certainly lead to an inability to identify those concrete actions which are likely to increase such loyalty most efficiently.

Prior art techniques for measuring loyalty often require information about existing business relationships to be provided in the form of structured quantitative data, such as numerical answers to predetermined survey questions. Such techniques have limited usefulness, however, because it can be difficult and time-consuming to obtain such structured quantitative data from partners to a relationship. What is needed, therefore, are techniques for measuring loyalty based on unstructured and/or non-quantitative data, such as letters, email messages, blog entries, and other documents written by partners to a relationship.

SUMMARY

One embodiment of the present invention is directed to a computer-implemented system that analyzes free-form text comments provided by a user (such as a customer of a company) and draws conclusions about the tone of the user's feedback, such as whether the user's feedback is positive, negative, angry, critical, or congratulatory. Such conclusions may be reflected in a single numerical value referred to herein as "emotivity." A customer's emotivity score may be used for various purposes, such as determining whether the customer is likely to provide a positive testimonial for the company, or whether a follow-up phone call should be made to the customer to improve the company's relationship with the customer. Furthermore, a measurement of the customer's loyalty to the company may be modified based on the user's measured emotivity.

In another embodiment of the present invention, a computer-implemented system analyzes free-form text comments provided by a user (such as a customer of a company) and draws conclusions about the opinions of the user based on the number of words in the user's comments, measured either as an absolute quantity or relative to a baseline, such as the average number of words in comments received from a plurality of users. A visual indication of the user's vocality may be displayed, such as a bullhorn with lines emanating from it, where the number of lines corresponds to the user's vocality. Furthermore, a measurement of the user's loyalty may be modified based on the user's vocality.

Measures of vocality and emotivity may be presented relative to each other. For example, if the user's input indicates that he has a negative opinion of the other party to the relationship, then the user may be deemed a "detractor" of the other party. Conversely, if the user's input indicates that he has a positive opinion of the other party to the relationship, then the user may be deemed an "advocate" of the other party. Such conclusions about the user may be combined with the user's vocality score to produce labels for the user such as "Non-Vocal," "Vocal" (e.g., if the user's input contains a large number of words that do not indicate either a positive or negative opinion of the other party), "Vocal Detractor" (if the user's input contains a large number of words indicating a negative opinion of the other party) and "Vocal Advocate" (if the user's input contains a large number of words indicating a positive opinion of the other party).

For example, one embodiment of the present invention is directed to a computer-implemented method comprising: (A) providing a survey to a plurality of people, the survey comprising a plurality of questions; (B) receiving, from the plurality of people, a plurality of sets of answers to the plurality of questions; (C) identifying a plurality of loyalty indices of the plurality of people based on the plurality of sets of answers; (D) for each of the plurality of people U: (D)(1) identifying text input T associated with person U; (D)(2) identifying a count E of words in text input T which are in a set of words representing strong emotions; (D)(3) identifying a count P of words in text input T which are in a set of words representing positive emotions; (D)(4) identifying a count N of words in text input T which are in a set of words representing negative emotions; and (E) selecting values of coefficients A, B, and C that maximize a value of $R^2$ between the plurality of loyalty indices and values of a variable Emo for the plurality of people, wherein Emo=$A*E+B*P+C*N$.

Another embodiment of the present invention is directed to a computer-implemented method comprising: (A) identifying a plurality of loyalty levels of a plurality of people; (B) identifying a plurality of text inputs provided by the plurality of people; (C) identifying a first subset of the plurality of people having loyalty levels satisfying a high loyalty level criterion; (D) identifying a second subset of the plurality of people having loyalty levels satisfying a low loyalty level criterion; (E) identifying a third subset of the plurality of people having loyalty levels not satisfying the high loyalty level criterion or the low loyalty level criterion; (F) identifying a first subset of the plurality of text inputs comprising text inputs provided by the first subset of the plurality of people and text inputs provided by the second subset of the plurality of people; (G) identifying a second subset of the plurality of text inputs comprising text inputs provided by the second subset of the plurality of people; and (H) identifying a third subset of the plurality of text inputs comprising the relative complement of the second subset of the plurality of text inputs relative to the first subset of the plurality of text inputs.

Yet another embodiment of the present invention is directed to a computer-implemented method comprising: (A) identifying a set of words representing strong emotions; (B) identifying a set of words representing positive emotions; (C) identifying a set of words representing negative emotions; (D) identifying first text input $T_1$ associated with a person; (E) identifying a first count $E_1$ of the strong emotion words in text input $I_1$; (F) identifying a first count $P_1$ of the positive emotion words in text input $I_1$; (F) identifying a first count $N_1$ of the negative emotion words in text input $I_1$; and (G) identifying a first value $V_1$ representing an emotional content of text input $I_1$ based on $E_1$, $P_1$, and $N_1$.

Yet a further embodiment of the present invention is directed to a computer-implemented method comprising: (A) receiving, from a plurality of people, a plurality of text inputs having a plurality of sizes; (B) identifying a statistic derived from the plurality of sizes; (C) selecting one of the plurality of text inputs $I_1$ from one of the plurality of people P; (D) identifying a size of text input $I_1$; and (E) selecting a measurement $V_1$ associated with person P based on the size of text input $I_1$ and the statistic derived from the plurality of sizes.

Another embodiment of the present invention is directed to a computer-implemented method comprising: (A) identifying text input T associated with a person; (B) counting a number of words W in the text input T; (C) providing, on an output device, a visual representation of W, comprising: (C)(1) identifying a range of values encompassing W; and (C)(2) identifying a visual representation corresponding to the range of values.

Other features and advantages of various aspects and embodiments of the present invention will become apparent from the following description and from the claims.

DETAILED DESCRIPTION

Certain embodiments of the present invention are directed to techniques for identifying a measure of emotion, referred to herein as "emotivity," associated with text associated with a first person. For example, the first person may be a customer of a company. The customer may provide text related to the customer's relationship to the company in any of a variety of ways. For example, the customer may provide free-form text responses to a survey about the customer's relationship to the company. As other examples, embodiments of the invention may capture text from email messages, blog entries, word processing documents, or other text written by the user, whether or not such text was written with the intent that is be used by embodiments of the present invention. The text obtained by the system, whatever the source of that text may be, may be analyzed to measure the emotivity of the customer in relation to the company. The customer's emotivity may, for example, be used in measuring the customer's loyalty to the company.

In one embodiment of the present invention, a single value representing the person's emotivity, referred to herein using the variable "Emotivity," is calculated using a formula of the form represented by Equation 1:

$$\text{Emotivity} = A * E\text{count} + B * P\text{count} + C * N\text{count} \qquad \text{Equation 1}$$

Figure 1:
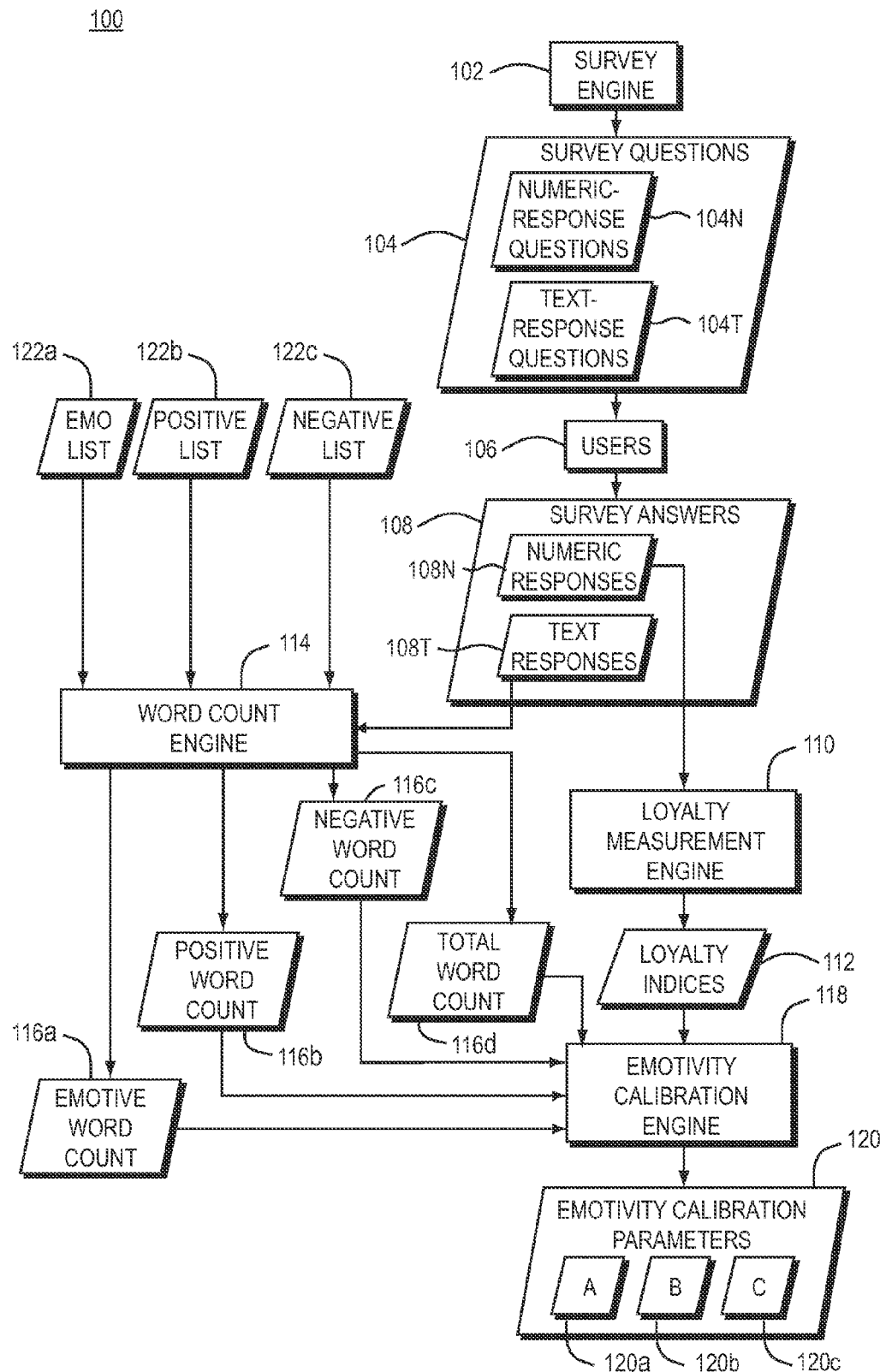
FIG. 1 is a dataflow diagram of a system for calibrating a system for identifying the emotivity of a user according to one embodiment of the present invention.
Figure 2:
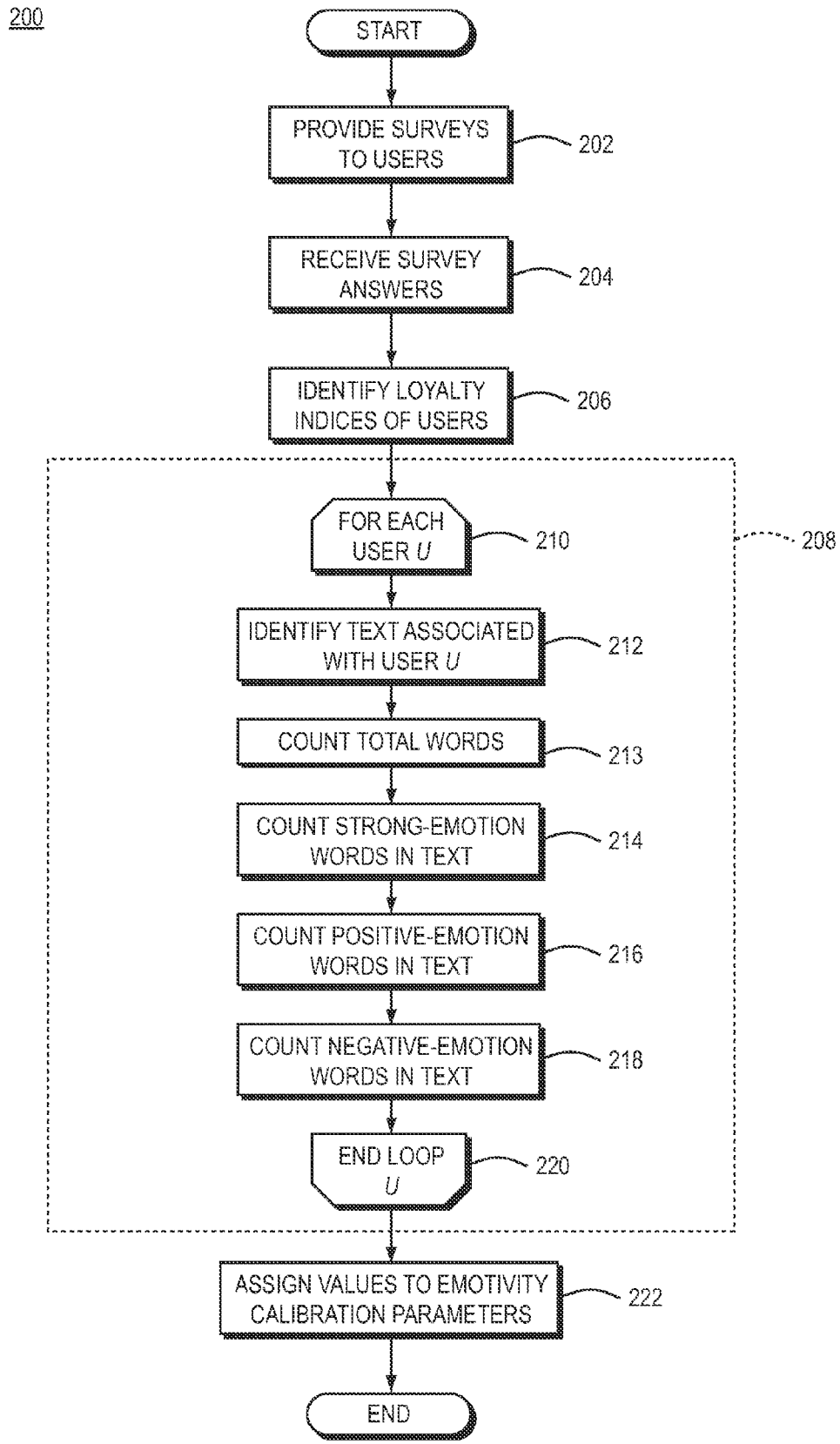
FIG. 2 is a flowchart of a method performed by the system of FIG. 1 according to one embodiment of the present invention.

In Equation 1, the variables A, B, and C are coefficients whose values must be initialized. Referring to FIG. 1, a dataflow diagram is shown of a system 100 that is used in one embodiment of the present invention to automatically generate values for coefficients A, B, and C. Referring to FIG. 2, a flowchart is shown of a method 200 that is performed by the system 100 of FIG. 1 according to one embodiment of the present invention. A survey engine 102 provides a survey 104, containing questions 104 relating to the practices and perceptions of partners to a relationship (such as business partners), to a plurality of users 106 (FIG. 2, step 202). The users 106 may, for example, be customers of a particular company.

The survey 104 may include two kinds of questions: (1) questions 104N calling for numeric responses, and (2) questions 104T calling for free-text responses. Examples of techniques for providing surveys calling for numeric responses are disclosed in above-referenced patent application Ser. No. 61/168,618. As disclosed therein, the questions 104N calling for numeric responses may, for example, each provide a statement and prompt the users 106 to provide a number indicating their degree of agreement with the statement. For example, a response of "1" may represent "Strongly Disagree," while a response of "5" may represent "Strongly Agree." The questions 104N may be divided into groups of questions corresponding to different dimensions of loyalty, as disclosed in the above-referenced patent application.

The questions 104T calling for free-text responses may be provided within the survey 104 in any of a variety of ways. For example, each of the numeric questions 104N may be followed by a prompt, such as "Comments:" or "Other:", which calls for the users 106 to provide free-text input relating to the immediately-preceding numeric question. As another example, each group within the numeric questions (corresponding to a loyalty dimension) may be followed by a prompt which calls for the users 106 to provide free-text input relating to the immediately-preceding group of questions. These are merely examples of ways in which the free-text questions 104T may be provided and do not constitute limitations of the present invention.

The users 106 provide answers 108 to the surveys 104. The answers 108 include both numeric answers 106N and textual answers 106T of the kinds described above. The answers 108 are received by a loyalty measurement engine 110 (step 204), which generates loyalty indices 112 for the users 106 based on the survey answers 108 (step 206). Examples of techniques that the loyalty measurement engine 110 may use to generate the loyalty indices 112 are described in the above-referenced patent application. In the particular embodiment illustrated in FIG. 1, the loyalty measurement engine 110 generates the loyalty indices 112 based solely on the numeric responses 108N, although this is not a limitation of the present invention.

A word count engine 114 counts, for each user, the total number of words in the user's answers, as well as the number of occurrences of words representing strong emotions (whether positive, negative, or otherwise), words representing positive emotions, and words representing negative emotions in each of the sets of survey answers 108 to produce words counts 116a, 116b, 116c, and 116d, respectively (step 208). Word counts 116a include, for each of the users 106, a count of "strong emotion" words used by that user, referred to herein by the variable Ecount. Similarly, word counts 116b include, for each of the users 106, a count of "positive emotion" words used by that user, referred to herein by the variable Pcount. Word counts 116c include, for each of the users 106, a count of "negative emotion" words used by that user, referred to herein by the variable Ncount. Word counts 116d include, for each of the users 106, a count of the total number of words used by that user.

The word count engine 114 may generate the word counts 116 by entering a loop over each user U (step 210) and identifying text T associated with user U (step 212). The text T identified in step 212 may, for example, be the set of all textual responses provided by user U to the survey 104 (i.e., the portion of textual responses 108T provided by user U) and/or otherwise captured by the system 100 (e.g., from blogs, word processing documents, and email messages). The word count engine 114 may then count, within text T, the total number of words used by user U (step 213). The word count engine 114 may then count, within text T, the number of words representing strong emotions to generate a value of Ecount for user U (step 214). The word count engine 114 may, for example, determine whether any particular word in text T represents a strong emotion by determining whether the word is contained within a predetermined list 122a (referred to herein as the "Emo list") of words representing strong emotions.

Similarly, the word count engine 114 may count, within text T, the number of words representing positive emotions to generate a value of Pcount for user U (step 216). The word count engine 114 may, for example, determine whether any particular word in text T represents a positive emotion by determining whether the word is contained within a predetermined list 122b (referred to herein as the "Positive list") of words representing positive emotions. Finally, the word count engine 114 may count, within text T, the number of words representing negative emotions to generate a value of Ncount for user U (step 218). The word count engine 114 may, for example, determine whether any particular word in text T represents a negative emotion by determining whether the word is contained within a predetermined list 122c (referred to herein as the "Negative list") of words representing negative emotions. The word count engine 114 may repeat steps 212-218 for the remaining users to complete the generation of counts 116a, 116b, and 116c (step 220).

The system 100 includes a calibration engine 118 which assigns values to a set of emotivity calibration parameters 120 based on the values of the word counts 116 (step 222). The calibration parameters 120 may include, for example, the coefficients A, B, and C of Equation 1 (represented in FIG. 1 by elements 120a, 120b, and 120c). In one embodiment, the calibration engine 120 assigns values to coefficients 120a, 120b, and 120c that maximize the $R^2$ in a multivariate regression of the plurality of loyalty indices 112 against the values of Emotivity (calculated using Equation 1) for all users 106.

Figure 3:
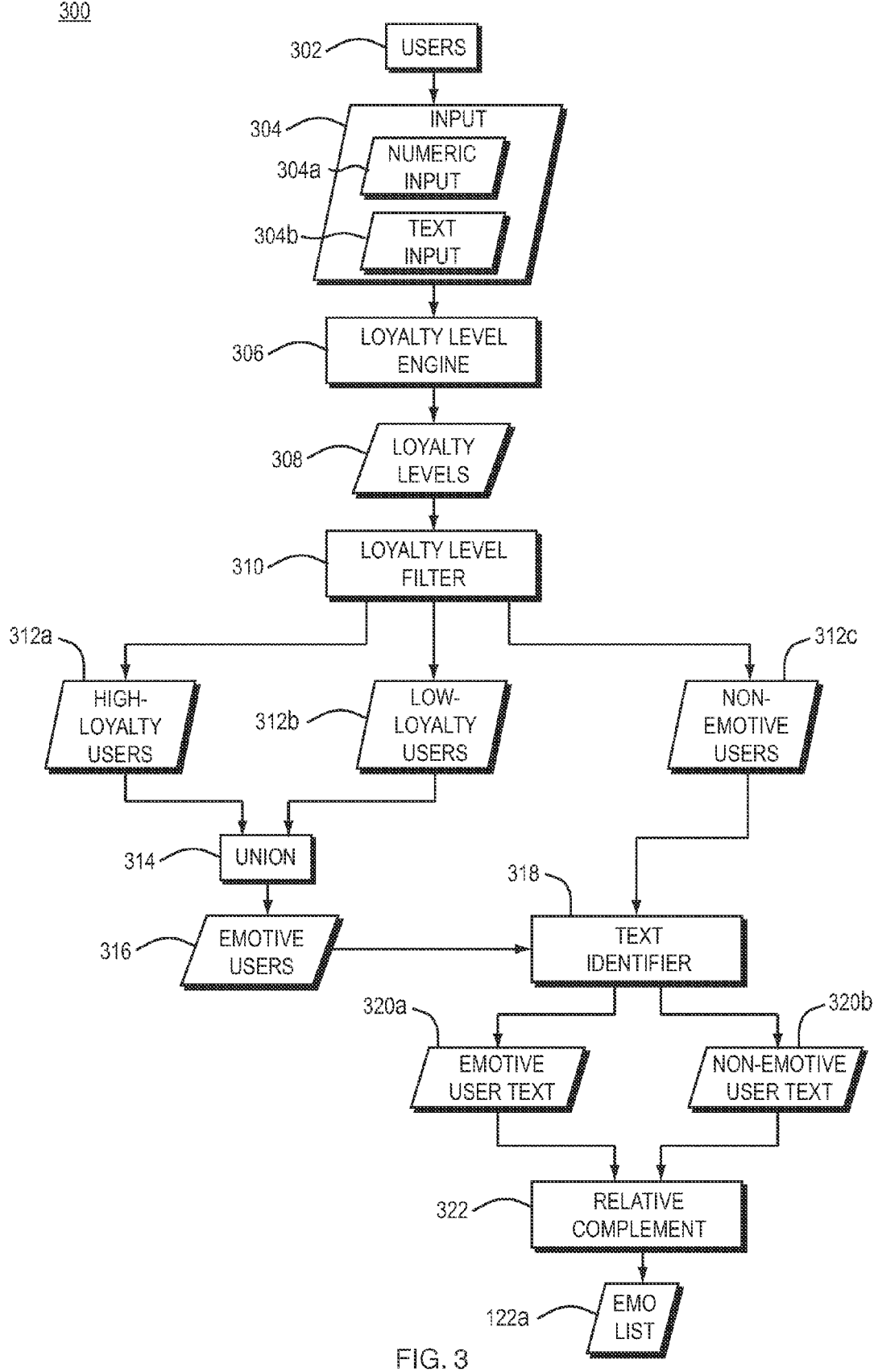
FIG. 3 is a dataflow diagram of a system for generating a list of words connoting strong emotions according to one embodiment of the present invention.
Figure 4:
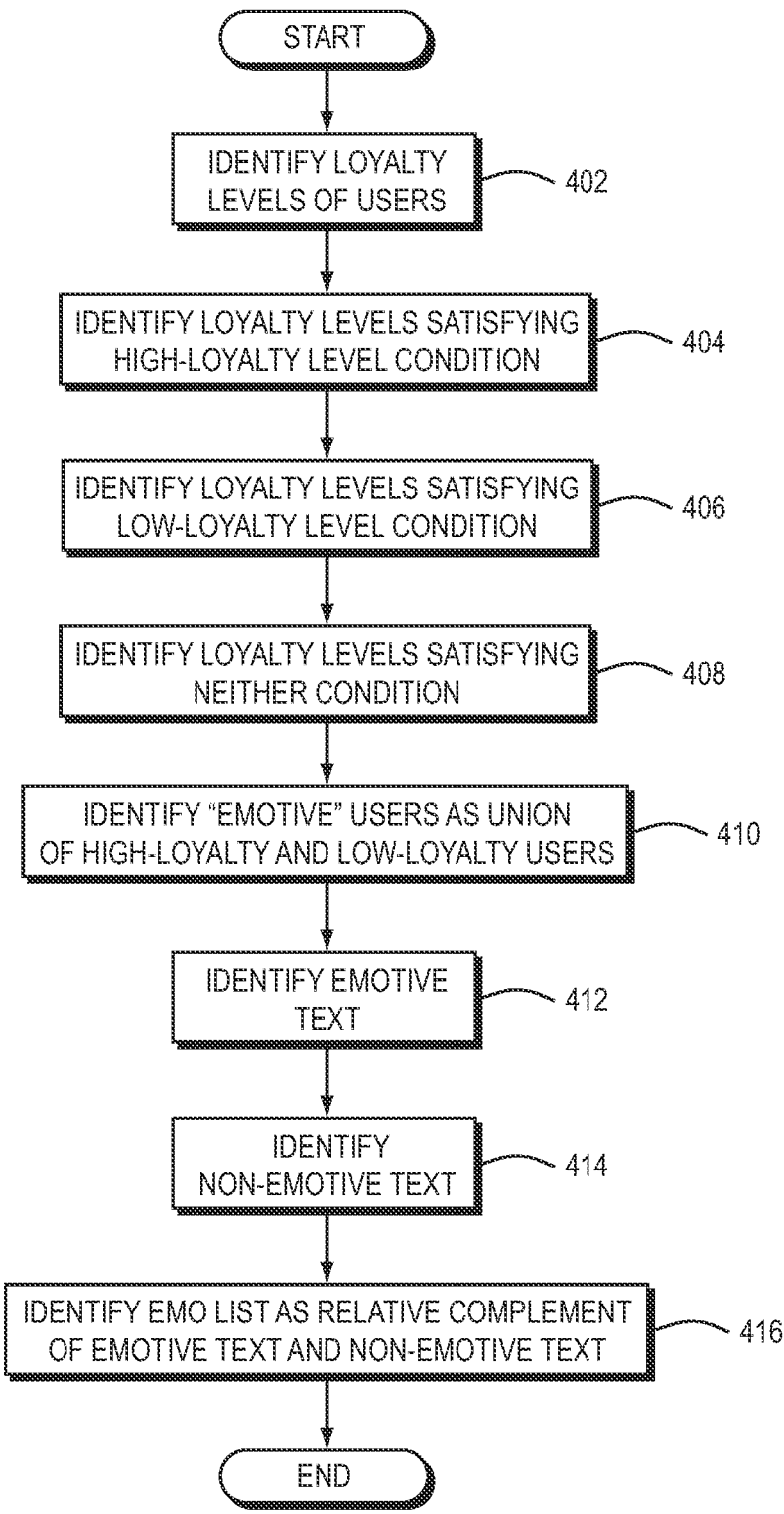
FIG. 4 is a flowchart of a method performed by the system of FIG. 3 according to one embodiment of the present invention.

As described above, the method 200 of FIG. 2 counts the number of occurrences of words that represent strong emotions, positive emotions, and negative emotions. As further described above, the method 200 may perform this function by using predetermined lists 122a, 122b, and 122c of words representing strong, positive, and negative emotions, respectively. Referring to FIG. 3, a dataflow diagram is shown of a system 300 that is used in one embodiment of the present invention to generate the Emo list 122a. Referring to FIG. 4, a flowchart is shown of a method 400 that is performed by the system 300 of FIG. 3 according to one embodiment of the present invention.

A loyalty level engine 306 identifies loyalty levels 308 of a plurality of users 302 based on input 304 provided by the users 302 (FIG. 4, step 402). Note that the users 302 in FIG. 3 may be, but need not be, the same users 106 as those shown in FIG. 1. Furthermore, the input 304 in FIG. 3 may be, but need not be, the survey responses 108 shown in FIG. 1. In the embodiment illustrated in FIG. 3, the input 304 includes both numeric input 304a and textual input 304b, which may correspond to the numeric responses 108N and the textual responses 108T, respectively, shown in FIG. 1. Note, however, that the textual input 304b may come from sources in addition to or instead of the textual survey responses 108T. For example, the textual input 304b may include word processing documents, email messages, web pages, or any other text created by or otherwise associated with the users 302. Furthermore, the textual input 304b need not be provided by the users 302 at the same time as the non-textual input 304a. For example, the users 302 may first provide the non-textual input 304a, and later provide the textual input 304b. Furthermore, the users 302 may provide different parts of the textual input 304b at different times.

The loyalty level engine 306 may, for example, identify the loyalty levels 308 based solely on the numeric input 304a. Examples of techniques that may be used by the loyalty level engine 306 to generate the loyalty levels 308 are disclosed in the above-referenced patent application Ser. No. 12/535,682. Furthermore, although the present discussion refers to loyalty levels, the techniques of FIGS. 3 and 4 may be applied to loyalty indices, such as the kind disclosed in patent application Ser. No. 12/535,682.

A loyalty level filter 310 identifies a set of loyalty levels 312a satisfying a predetermined high-loyalty level condition (step 404). For example, assume for purposes of the following discussion that the loyalty-level numbering scheme disclosed in the above-referenced patent application is used, in which there are four loyalty levels representing increasing degrees of loyalty in the following sequence: −1, 1, 2, and 3. In step 404, users having a loyalty level of 3, for example, may be identified as the high-loyalty users 312a.

The loyalty level filter 310 also identifies a set of loyalty levels 312b satisfying a predetermined low-loyalty level condition (step 406). For example, users having a loyalty level of −1 according to the labeling scheme described above may be identified in step 406 as the low-loyalty users 312b.

The loyalty level filter 312 also identifies a set of loyalty levels 312c which do not satisfy either the high-loyalty or low-loyalty conditions (step 408). For example, users having a loyalty level of 1 or 2 according to the labeling scheme described above may be identified in step 408 as the "remainder" or "non-emotive" users 312c.

The system 300 identifies "emotive" users 316 as the union 314 of the high-loyalty level users 312a and low-loyalty level users 312b (step 410).

Note that the loyalty levels 308 may include pointers (not shown) back to the text input 304b provided by the corresponding one of the users 302. As a result, the various filtered loyalty levels 312a-c may be used to identify the corresponding text inputs 304b of the users having those loyalty levels. A text identifier 318 identifies a set of "emotive" text 320a as the set of all text input (in text input 304b) provided by users in the set of emotive users 316 (step 412). The text identifier identifies a set of "non-emotive" text 320b as the set of all text input (in text input 304b) provided by users in the set of non-emotive users 312c (step 414).

The "Emo list" 122a is identified as the set of text which occurs in the emotive text 320a but not in the non-emotive text 320b, in other words, as the relative complement 322 of the non-emotive text 320b in the emotive text 320a (step 416).

The positive list 122b and negative list 122c (FIG. 1) may also be generated in any of a variety of ways. For example, the positive list 122b may be generated by selecting an initial set of words (e.g., from a dictionary) representing positive emotions, and then expanding the initial list to create the positive list 122b by adding synonyms (e.g., from a thesaurus) of the initial set of positive words. Similarly, the negative list 122c may be generated by selecting an initial set of words (e.g., from a dictionary) representing negative emotions, and then expanding the initial list to create the negative list 122c by adding synonyms (e.g., from a thesaurus) of the initial set of negative words. The positive list 122b and/or negative list 122c may be customized in a variety of ways, such as by tailoring them to a particular industry and/or company.

Figure 5:
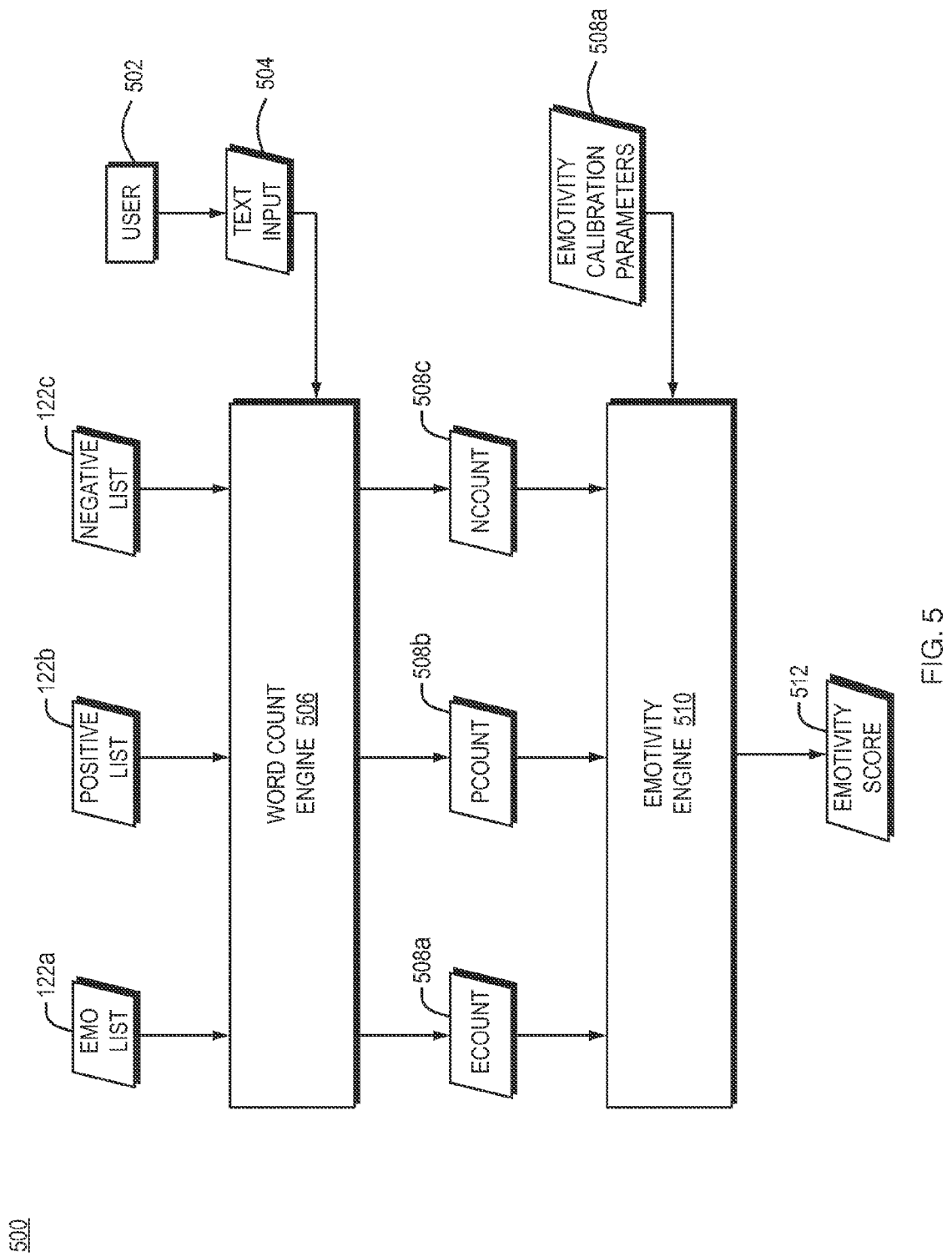
FIG. 5 is a dataflow diagram of a system for generating an emotivity score of a user according to one embodiment of the present invention.
Figure 6:
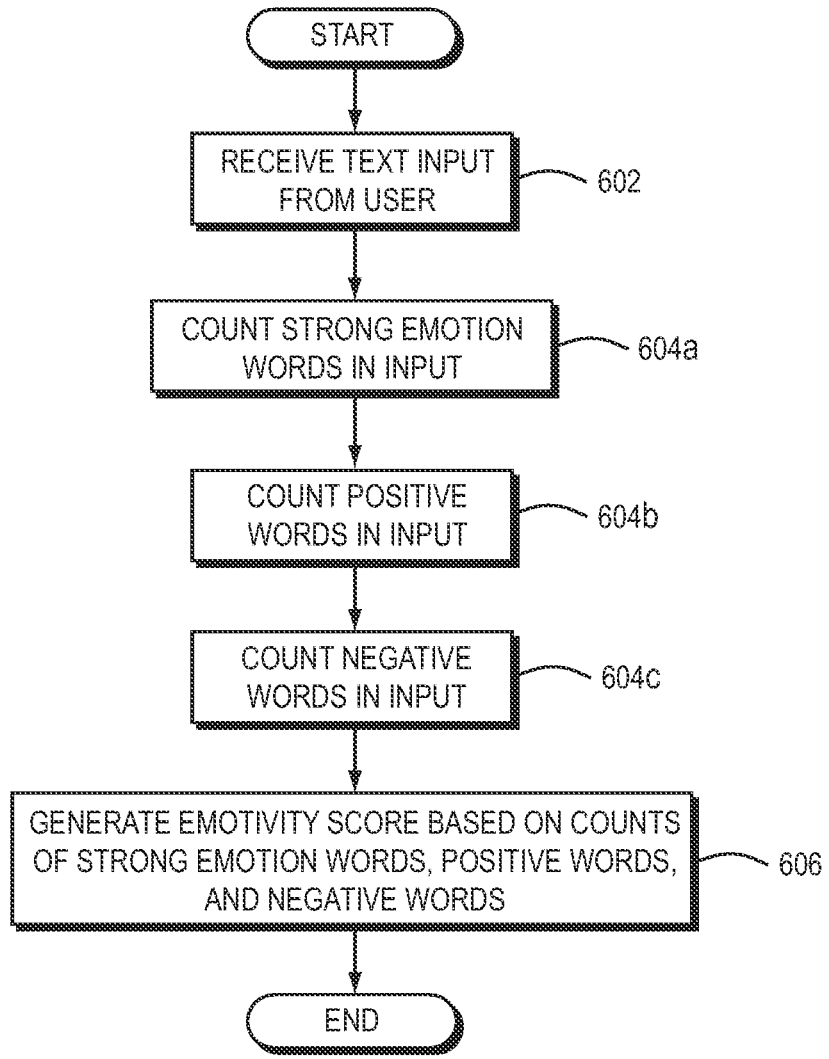
FIG. 6 is a flowchart of a method performed by the system of FIG. 5 according to one embodiment of the present invention.

As mentioned above, various embodiments of the present invention may be used to generate an emotivity score for a user based on textual input provided by the user. For example, Equation 1 may be used to generate an emotivity score, represented by the value of the variable Emotivity, for a user based on the values of the coefficients A, B, and C, and the word counts ECount, PCount, and Ncount for that user. Referring to FIG. 5, a dataflow diagram is shown of a system 500 for generating an emotivity score 512 for a user 502 in this manner according to one embodiment of the present invention. Referring to FIG. 6, a flowchart is shown of a method 600 performed by the system 500 of FIG. 5 according to one embodiment of the present invention.

A user 502 provides textual input 504 to the system 500 (FIG. 6, step 602). The textual input 504 may take any form, such as free-form text responses to a survey, email messages, web pages, word processing documents, or any combination thereof. Note that if the textual input 504 is part of the free-text survey responses 108T shown in FIG. 1, the calibration process illustrated in FIGS. 1 and 2 may be integrated with the emotivity score generation process illustrated in FIGS. 5 and 6, such that the same set of user inputs 108 is used both to calibrate the system 100 and to generate emotivity scores for the users 106 of the system 100.

Note, however, that the user 502 need not have provided any of the survey responses 108 shown in FIG. 1. Furthermore, the emotivity score 512 of the user 502 may be identified using the system 500 of FIG. 5 even if the loyalty level and/or loyalty index of the user 502 is unknown. All that is required from the user 502 to identify the user's emotivity score 512 is the user's textual input 504.

A word count engine 506 produces a count 508a of emotive words (step 604a), positive words (step 604b) and negative words (step 604c) in the users' input 504. The word count engine 506 may produce the word counts 508a-c by, for example, counting the frequencies of occurrence of words in the emo list 122a, positive list 122b, and negative list 122c, respectively, in the user's textual input 504.

An emotivity engine 510 generates the emotivity score 512 for the user 502 based on the word counts 508a-c and the emotivity calibration parameters 120 shown in FIG. 1 (step 606). As described above, the emotivity calibration parameters 120 may, for example, be the coefficients A, B, and C in Equation 1. Furthermore, the counts 508a, 508b, and 508c may be the variables Ecount, PCount, and NCount in Equation 1. Therefore, the emotivity engine 510 may generate the emotivity score 512 for the user 502 by calculating Equation 1, which applies a linear weighting of the counts 508a-c, using coefficients A, B, and C as weights.

Various embodiments of the present invention may be used to measure the "vocality" of a user. The term "vocality," as used herein, refers generally to the absolute and/or relative size of the input provided by the user, such as the number of words, characters, or sentences provided by the user in response to a survey. The user may, for example, provide such input in the form of typed free-form text, such as text provided in response to survey questions. The user may, however, provide such input in other ways, such as by selecting pre-written sentences or paragraphs from a library of text responses.

The vocality of a particular user may, for example, be represented as a single number V, such as the number of words W in the user's input. A user's vocality may, however, be a function of W and/or other values derived from input provided by the user and/or other users. For example, once the number of words W provided by the user has been counted, the user's vocality V may be obtained as a function of W. Such a function may take any of a variety of forms. For example, the function may map some fixed number of non-overlapping ranges of W to the same number of vocality values. For example, the ranges W<10, 10<=W<50, 50<=W<500, and 500<=W may be mapped to four distinct values of V. Such vocality values may take any form, such as whole numbers (e.g., 1, 2, 3, and 4, respectively) or text labels, such as "Non-Vocal," "Mildly Vocal," "Very Vocal," and "Extremely Vocal." The user's vocality may be absolute or relative. For example, it may represent the absolute number of words in the user's input, or a relationship of the number of words in the user's input to a baseline, such as the average number of words in input received from a plurality of users. In the latter case, the user's vocality score may be represented in any of a variety of ways, such as a value representing the number of words (positive or negative) by which the number of words used by the user deviates from the baseline, the percentage (positive or negative) by which the number of words used by the user deviates from the baseline, or a range within which the user's vocality falls relative to the baseline (e.g., low, medium, or high).

A user's vocality score may be combined with analysis of the content of the user's input. For example, if the user's input indicates that he has a negative opinion of the other party to the relationship, then the user may be deemed a "detractor" of the other party. Conversely, if the user's input indicates that he has a positive opinion of the other party to the relationship, then the user may be deemed an "advocate" of the other party. Such conclusions about the user may be combined with the user's vocality score to produce labels for the user such as "Non-Vocal," "Vocal" (e.g., if the user's input contains a large number of words that do not indicate either a positive or negative opinion of the other party), "Vocal Detractor" (if the user's input contains a large number of words indicating a negative opinion of the other party) and "Vocal Advocate" (if the user's input contains a large number of words indicating a positive opinion of the other party).

A user interface may be provided which displays information representing the user's vocality score. The visual display of the user's vocality score may take any of a variety of forms, such as the user's raw or normalized vocality score itself, the text label corresponding to the user's vocality score (e.g., "Vocal Advocate"), or a graphical icon representing the user's vocality score. For example, the graphical icon may be a megaphone from which zero or more lines emanate, where the number, size, or shape of the lines emanating from the megaphone correspond to the user's vocality score. Such an icon provides a visual indication of the user's vocality score that can be understood at a glance.

Having described the concept of vocality generally, various techniques for measuring the vocality of one or more users will now be described according to embodiments of the present invention. For example, referring to FIG. 7, a dataflow diagram is shown of a system 700 for measuring the vocality of a plurality of users 702 according to one embodiment of the present invention. Referring to FIGS. 8A-8B, flowcharts are shown of a method 800 performed by the system 700 of FIG. 7 according to one embodiment of the present invention.

The users 702 provide textual input 704 to the system 700 (FIG. 8A, step 802). The textual input 704 may take any form, such as free-form text (such as responses to a survey), email messages, web pages, word processing documents, or any combination thereof. The textual input 704 may, for example, be part of the free-text survey responses 108T shown in FIG. 1, in which case the vocality measurement process 800 illustrated in FIGS. 7 and 8A-8C may be integrated with the calibration process 100 illustrated in FIGS. 1 and 2, and/or with the emotivity score generation process 600 illustrated in FIGS. 5 and 6, such that the same set of user inputs 108 is used to calibrate the system 100 of FIG. 1, to generate emotivity scores, and to generate vocality scores.

Figure 7:
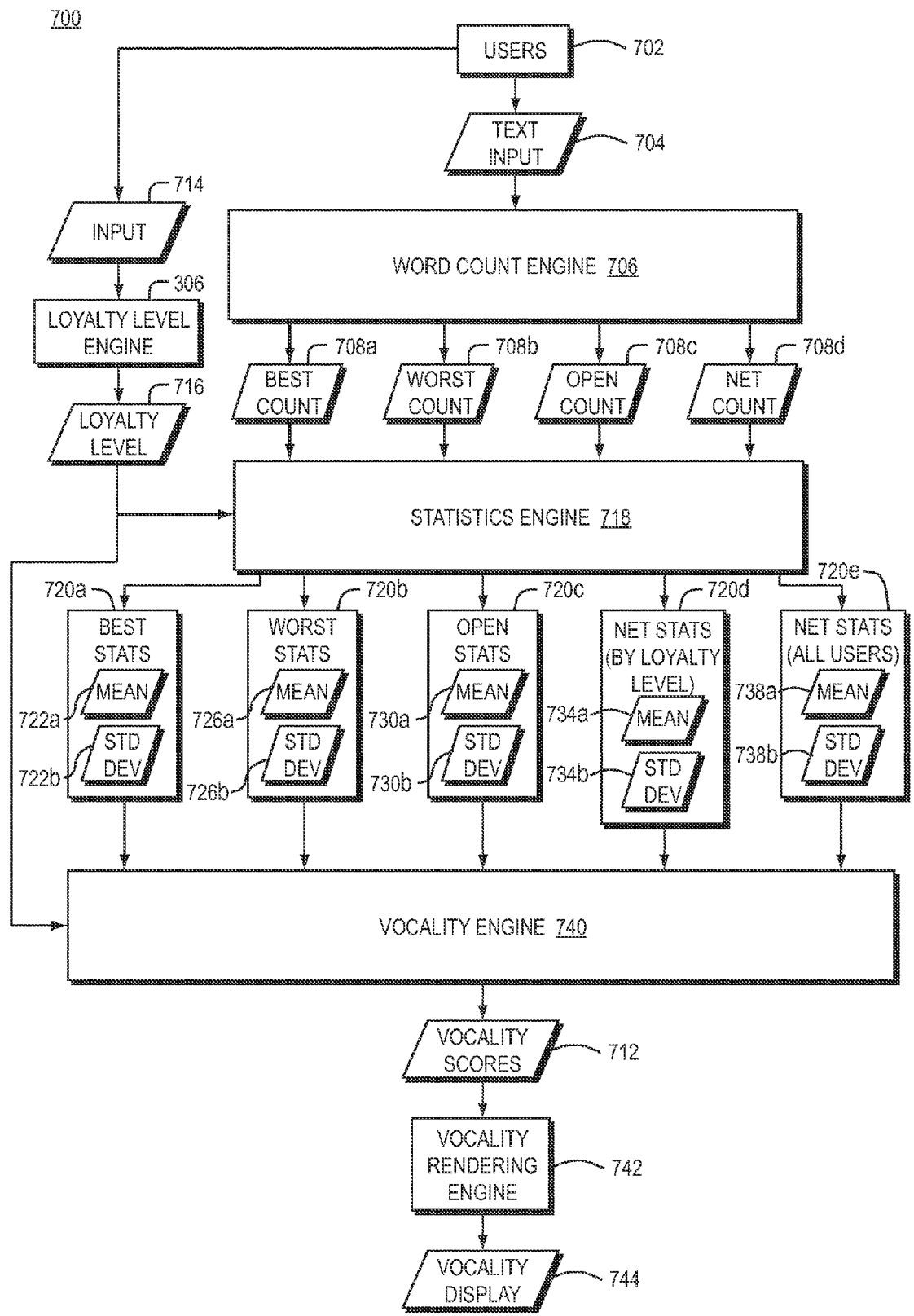
FIG. 7 is a dataflow diagram of a system for generating vocality scores for a plurality of users according to one embodiment of the present invention.
Figure 8A:
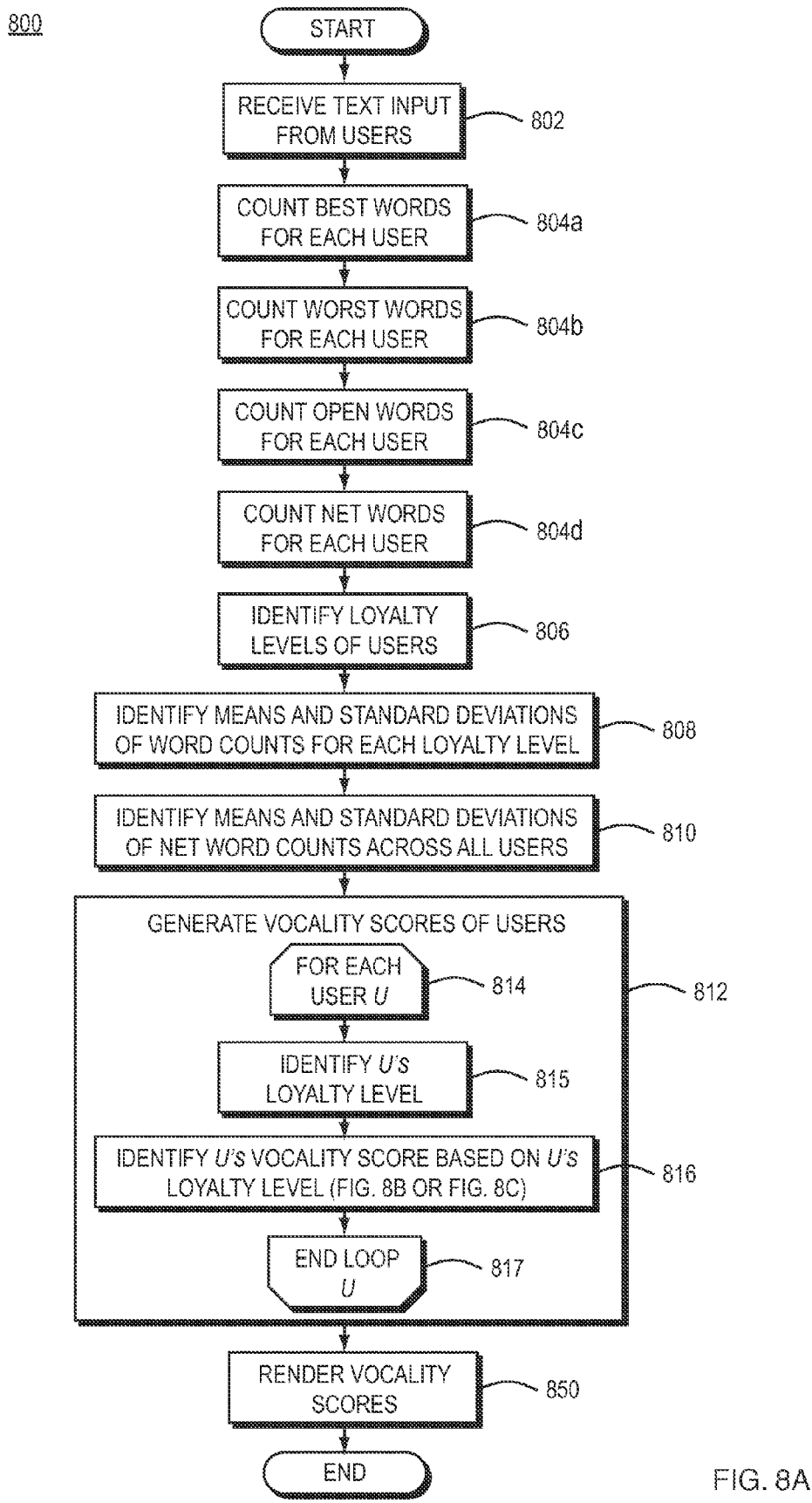
FIGS. 8A-8C are flowcharts of methods performed by the system of FIG. 7 according to various embodiments of the present invention.
Figure 8B:
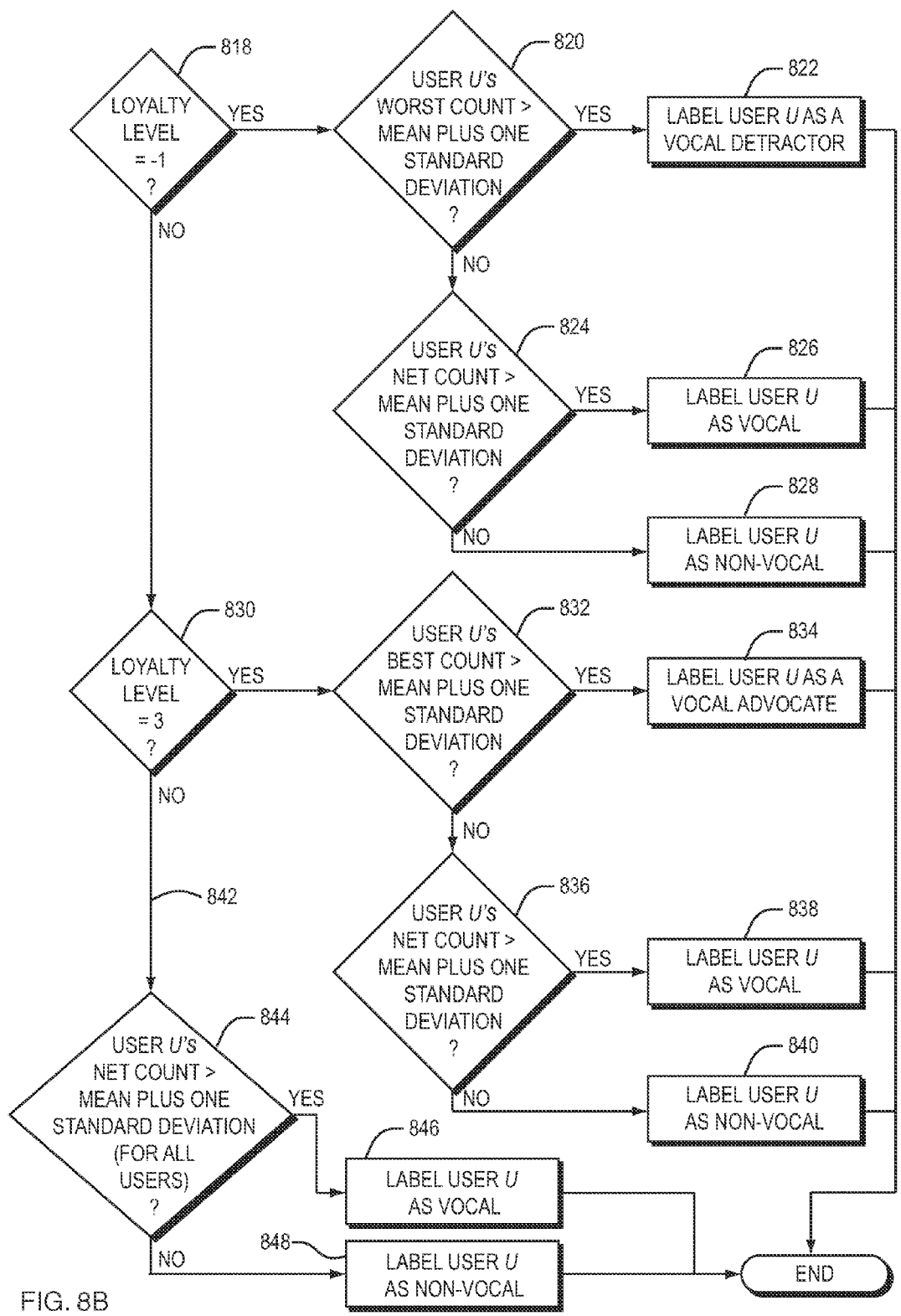

Note, however, that the users 702 shown in FIG. 7 need not have provided any of the survey responses 108 shown in FIG. 1. Furthermore, although the vocality scores 712 shown in FIG. 7 are generated using information in addition to the users' textual input 704, this is not a requirement of the present invention. Rather, all that is required from the users 702 to identify the users' vocality scores 712 are the users' textual input 704.

A word count engine 706 produces various counts 708a-d of words in the users' textual input 704. More specifically, in the particular example illustrated in FIGS. 7 and 8A-8C, the word count engine 706 counts the number of words provided by each of the users 702 in response to one or more questions which prompted the users 702 to describe positive aspects of the users' relationship partners (step 804a). For example, consider a survey question such as, "What does your partner do well, that you would like him or her to continue to do?" Such a question solicits positive information about the user's relationship partner. In step 804a, the word count engine 706 may count the number of words in the textual input 704 provided by each of the users 702 in response to such a question, to produce what are referred to herein as a count of the "best" words for each of the users 702. If the survey includes multiple such questions, then each user's "best count" may be equal to the aggregate number of words provided by the user in response to all such questions.

Similarly, the word count engine 706 counts the number of words provided by each of the users 702 in response to one or more questions which prompted the users 702 to describe negative aspects of the users' relationship partners (step 804b). For example, consider a survey question such as, "What does your partner not do well, that you would like him or her to improve?" Such a question solicits negative information about the user's relationship partner. In step 804b, the word count engine 706 may count the number of words in the textual input 704 provided by each of the users 702 in response to such a question, to produce what are referred to herein as a count of the "worst" words for each of the users 702. If the survey includes multiple such questions, then each user's "worst count" may be equal to the aggregate number of words provided by the user in response to all such questions.

Similarly, the word count engine 706 counts the number of words provided by each of the users 702 in response to one or more open-ended questions (step 804c). For example, consider a survey question such as, "Is there any other information you would like to provide about your relationship partner?" Such a question solicits open-ended information about the user's relationship partner. In step 804c, the word count engine 706 may count the number of words in the textual input 704 provided by each of the users 702 in response to such a question, to produce what are referred to herein as a count of the "open" words for each of the users 702. If the survey includes multiple such questions, then each user's "open count" may be equal to the aggregate number of words provided by the user in response to all such questions.

Input may be identified as being associated with positive, negative, or open-ended information even if such information was not provided in response to survey questions. Rather, any technique may be used to identify input from the users 702 as providing positive, negative, or open-ended information and to count the number of words in such input. For example, the input that is used in steps 804a-c above may be drawn from email messages, word processing documents, web pages, or other data created by the users 702. Furthermore, the word count engine 706 may count any subset of the input provided by the users 702. For example, if the users' input 704 is a set of survey responses which include both multiple-choice responses and free text responses, the word count engine 506 may be configured only to count words in the user's free text responses.

The word count engine 706 sums the positive, negative, and open-ended word counts 708a-c to produce net word counts 708d for each of the users 702 (step 804d). Note that although in the embodiment illustrated in FIGS. 7 and 8A-8C, the net word count 708d for a particular user is the sum of three other word counts 708a-c, this is merely an example and does not constitute a limitation of the present invention. Rather, the net word count 708d may be a sum of any number of other word counts. Furthermore, the component word counts need not represent positive, negative, and open-ended information. Rather, each of the component word counts may be defined to correspond to any desired kind of information.

The users' vocality scores 712 may be derived from the word counts 708a-d and, optionally, from loyalty levels 716 produced by the loyalty level engine 306 based on input 714 provided by the users 714 in the manner described above with respect to FIGS. 3 and 4 (step 806). The input 714 that is used to identify the users' loyalty levels 716 may be, but need not be, the same as the input 704 provided to the word count engine 706. For example, the users 702 may be provided with a set of surveys, the answers to which may be used to derive the users' loyalty levels 716, emotivity scores 512, and vocality scores 712. Alternatively, however, the loyalty levels 716, emotivity scores 512, and vocality scores 712 may be derived from separate sets of inputs. For example, the loyalty levels 716 may be derived from answers to surveys, while the emotivity scores 512 and vocality scores 712 may be derived from free-text in email messages, word processing documents, and blog entries.

A statistics engine 718 generates, for each loyalty level, statistics 720a-d derived from the word counts 708a-d (step 808). In the example shown in FIG. 7, the statistics 720a-d include, for each loyalty level, the means and standard deviations of the corresponding word counts 708*a-d*. For example, statistics 720*a* include means 722*a* and 722*d*, derived from the "best" word counts 708*a*. Assuming that there are four loyalty levels, means 722*a* include four means: the mean of the best word counts for users with loyalty levels of −1, 1, 2, and 3, respectively. Similarly, standard deviations 722*b* include four standard deviations: the standard deviations of the best word counts for users with loyalty levels of −1, 1, 2, and 3, respectively.

Similarly, statistics 720*b* include means 726*a* and standard deviations 726*b*, derived from "worst" word counts 708*b*; statistics 720*c* include means 730*a* and standard deviations 730*b*, derived from "open" word counts 708*c*; and statistics 720*c* include means 734*a* and 734*b*, derived from "open" word counts 708*c*. The statistics engine 718 also identifies statistics 720*e* (including means 738*a* and standard deviations 738*b*) of the net word counts 708*d* across all users 702 (step 810). Note that all of these statistics 720*a-e* are merely examples and do not constitute limitations of the present invention; other statistics may be used to perform the functions described herein as being performed by the statistics 720*a-e*.

Referring to FIG. 8B, a vocality engine 740 generates vocality scores 712 for the users 702 as follows (step 812). For each user (step 814), the vocality engine 740 identifies the user's loyalty level (step 815). The method 800 then identifies the user's vocality score based on the user's loyalty level (step 816). Examples of techniques that may be used to compute the user's vocality score are described below with respect to FIGS. 8B and 8C. The vocality scores for the remaining users may be computed by repeating steps 815-816 (step 817).

Referring to FIG. 8B, a flowchart is shown of one method that may be used to identify a user's vocality score, assuming that the user's loyalty level is known. If the user's loyalty level is −1 (step 818), then: (1) if the user's worst word count 708*b* is one standard deviation 726*b* or more above the mean 726*a* for users having a loyalty level of −1 (step 820), then a vocality score of "Vocal Detractor" is assigned to the user (step 822); (2) otherwise, if the user's net word count 708*d* is one standard deviation 734*b* or more above the mean 734*a* for users having a loyalty level of −1 (step 824), then a vocality score of "Vocal" is assigned to the user (step 826); (3) otherwise, a vocality score of "Non-Vocal" is assigned to the user (step 828).

If the user's loyalty level is 3 (step 830), then: (1) if the user's best word count 708*a* is one standard deviation 728*b* or more above the mean 728*a* for users having a loyalty level of 3 (step 832), then a vocality score of "Vocal Advocate" is assigned to the user (step 834); (2) otherwise, if the user's net word count 708*d* is one standard deviation 734*b* or more above the mean 734*a* for users having a loyalty level of 3 (step 836), then a vocality score of "Vocal" is assigned to the user (step 838); (3) otherwise, a score of "Non-Vocal" is assigned to the user (step 840).

If the user's loyalty level is 1 or 2 (step 842), then: (1) if the user's net word count 708*d* is one standard deviation 738*b* or more above the mean 738*a* for all users (step 844), then a vocality score of "Vocal" is assigned to the user (step 846); (2) otherwise, a vocality score of "Non-Vocal" is assigned to the user (step 848).

Figure 9A:
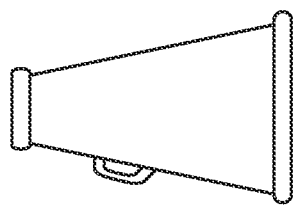
FIGS. 9A-9D are illustrations of icons representing vocality levels according to embodiments of the present invention.
Figure 9B:
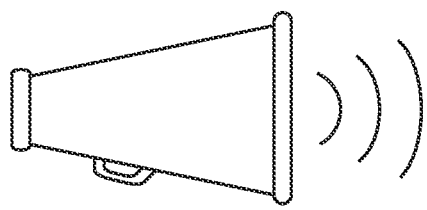
Figure 9C:
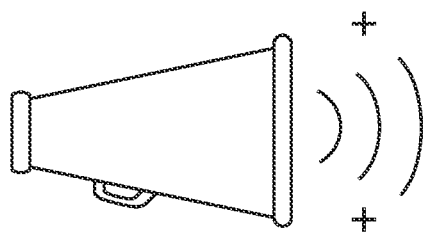
Figure 9D:
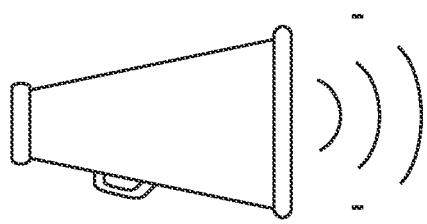

Once the users' vocality scores 712 have been identified, a vocality rendering engine 742 may produce output 744 which represents the vocality scores 712 in any of a variety of ways (step 850). For example, when the profile for a particular user is displayed, the profile may display information such as the user's name, title, email address, and loyalty level. The display may also include an icon, such as a megaphone, which graphically represents the user's vocality score. For example, the bullhorn may have zero or more lines emanating from it, where the number, shape, and/or size of the lines corresponds to the user's vocality score. For example, a "Non-Vocal" user's megaphone may have no lines emanating from it (FIG. 9A), a "Vocal" user's megaphone may have several lines emanating from it (FIG. 9B), a "Vocal Advocate" user's megaphone may have lines with plus signs emanating from it (FIG. 9C), and a "Vocal Detractor" user's megaphone may have lines with minus signs emanating from it (FIG. 9D). Clicking on the megaphone may cause the system 700 to display the user's textual input 704, or other data created by the user which resulted in the user's vocality score.

The techniques described above with respect to FIGS. 7 and 8A-8C are merely one example of how vocality may be measured, and do not constitute a limitation of the present invention. For example, the distinction in FIGS. 7 and 8A-8C between "Detractors" and "Advocates" may be ignored when measuring users' vocality, so that users are merely labeled "Vocal" or "Non-Vocal" depending on the numbers of words in their input. Such a technique may be applied in FIG. 8B, for example, by labeling users as "Vocal" in step 822 (instead of "Vocal Detractors") and in step 834 (instead of "Vocal Advocates").

Furthermore, although in the example just described, users are classified either as "Vocal" or "Non-Vocal," users' degrees of vocality may be divided into more than two categories. Rather, any number of values of any kind may be used to represent users' degrees of vocality.

Furthermore, in the example illustrated in FIGS. 7 and 8A-8C, any given user is classified as "Vocal" or "Non-Vocal" based on the number of words in that user's input relative to the numbers of words used by other users in their input. Although using statistical measures of the numbers of words used by a population of users to draw the dividing line between "Vocal" and "Non-Vocal" users may be useful, it is not a requirement of the present invention. Rather, breakpoints between "Vocal" and "Non-Vocal" users (and between any other values used to represent vocality) may be absolute values, chosen in any manner, rather than values chosen relative to the input of a population of users. More generally, such breakpoints may be chosen in any manner and may change over time.

As yet another example of how vocality may be measured, consider an embodiment of the present invention which uses three vocality values, referred to herein as "Non-Vocal," "Vocal Advocate," and "Vocal Detractor." In this embodiment, whether a particular user is Vocal (whether Advocate or Detractor) rather than Non-Vocal may be determined in the manner described above with respect to FIGS. 7 and 8A-8B, namely by determining whether the number of words used by the user is more than one standard of deviation greater than the mean for users having the same loyalty level. In this embodiment, however, whether the user is considered an Advocate or a Detractor is based not on the user's loyalty level, but rather on the ratio of the user's "best" word count to the user's "worst" word count.

Figure 8C:
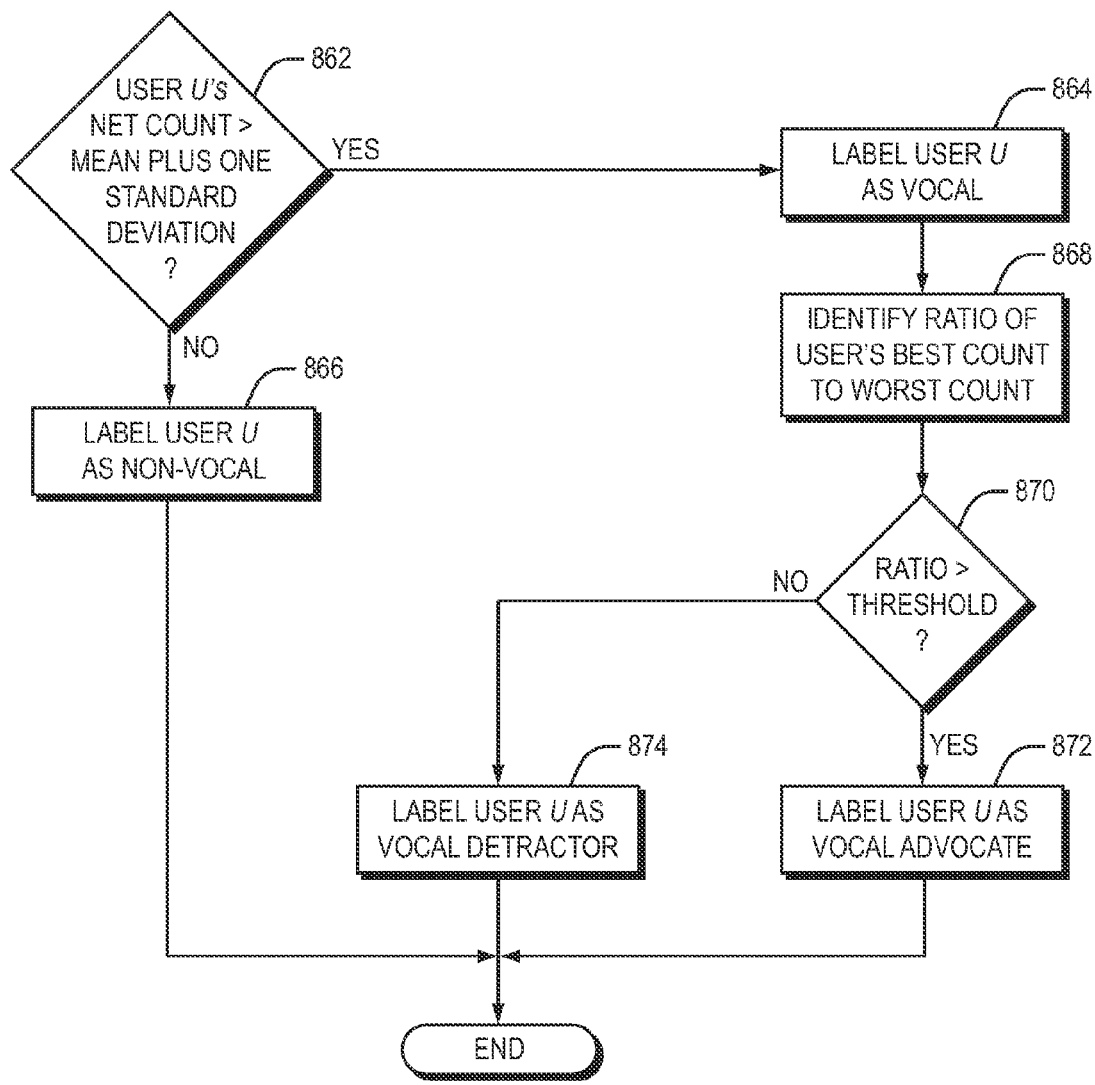

More specifically, once the user's loyalty level is known (FIG. 8A, step 815), then the method shown in FIG. 8C may be used to compute the user's vocality score. If the user's net word count 708*d* is one standard deviation 734*b* or more above the mean 734*a* for users having the same loyalty level (step 862), then a vocality score of "Vocal" is assigned to the user (step 864). Otherwise, the user is assigned a vocality score of "Non-Vocal" (step 866).

If the user is labeled as Vocal (step 864), then the method computes the ratio of the user's best word count 708*a* to the user's worth word count 708*b* (step 868). The method may add a nominal value, such as 0.1, to the user's worst word count in step 868 to avoid division by zero. The method then determines whether the ratio is greater than some predetermined threshold, such as 0.66 (step 870). If the ratio exceeds the threshold, the user is assigned a vocality score of "Vocal Advocate" (step 872). Otherwise, the user is assigned a vocality score of "Vocal Detractor" (step 874).

Note that the method of FIG. 8C may result in users with low (e.g., −1) loyalty levels being labeled as Vocal Advocates, and users with high (e.g., 3) loyalty levels being labeled as Vocal Detractors. This is surprising, since one would expect users with low loyalty levels to be detractors and users with high loyalty levels to be advocates. Special attention should be paid to Advocates with low loyalty levels and Detractors with high loyalty levels, because by focusing on these customers, both the Loyalty and Vocality of the customer base can be increased. Alternatively, the loyalty levels of conflicted respondents may be modified so that their loyalty levels match their status as Advocates or Detractors, as indicated by their vocality. More specifically, if a user's vocality indicates that he or she is an Advocate, then the user's loyalty level may be incremented or changed to the maximum loyalty level. Conversely, if the user's vocality indicates that he or she is a Detractor, then the user's loyalty level may be decremented or changed to the minimum loyalty level.

The techniques described above are examples of ways in which the emotivity and/or vocality of text may be measured. Although it may be useful to measure the emotivity and/or vocality of a particular text written by a particular user, it may also be useful to measure the emotivity and/or vocality of: (1) a particular user over time, and/or (2) a collection of users over time. Such measurements may be used to identify trends in emotivity and/or vocality, and thereby to identify trends in loyalty, over time.

Figure 10:
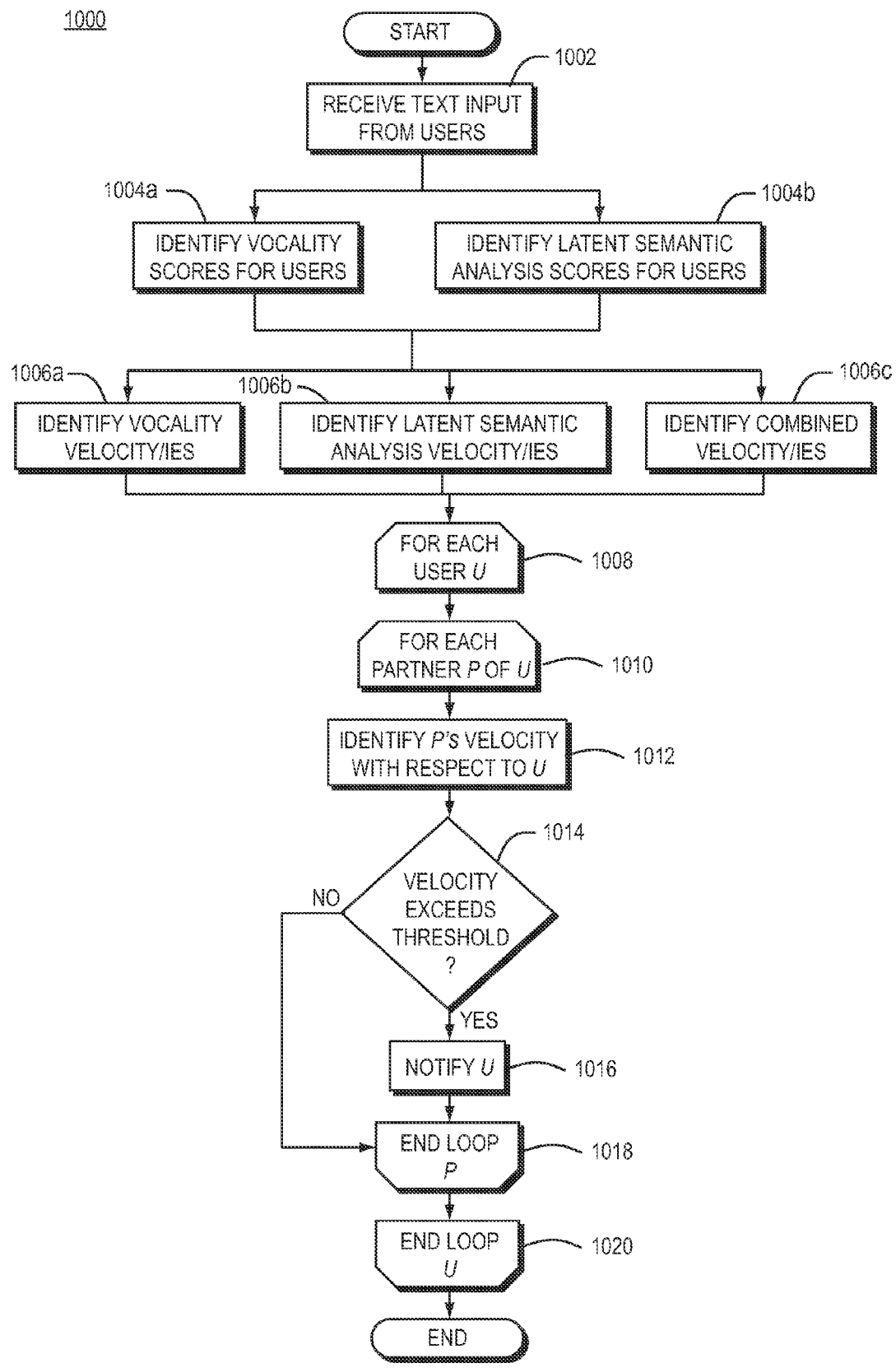
FIG. 10 is a flowchart of a method for identifying trends in loyalty of a user over time according to one embodiment of the present invention.

For example, referring to FIG. 10, a flowchart is shown of a method 1000 performed in one embodiment of the present invention to identify trends in loyalty of a single user over time. The method 1000 receives text input from one or more users (step 1002). The method 1000 then identifies a vocality score (step 1004*a*) and/or an emotivity score (step 1004*b*) for each of the users, based on the received text input. The vocality scores may, for example, be identified in the manner disclosed herein in connection with FIGS. 7 and 8A-8C, or in any other way. Similarly, the emotivity scores may, for example, be identified in the manner disclosed herein in connection with FIGS. 5-6, or in any other manner.

Note that the method 1000 may generate only vocality scores, only emotivity scores, or both vocality scores and emotivity scores for each of the users. Furthermore, the emotivity scores are merely one example of measurements that may be generated using latent semantic analysis. Therefore, other forms of latent semantic analysis may be applied to the input text to produce measurements other than emotivity scores.

The method 1000 may then identify one or more measurements of velocity in: the vocality scores (step 1006*a*), the latent semantic analysis (e.g., emotivity) scores (step 1006*b*), and the combination of the vocality and latent semantic analysis scores (step 1006*c*). In general, the "velocity" of a set of scores over time refers to the rate of change of the scores over time. Such velocity may be measured, for example, using any known techniques for measuring velocity, where the series of scores is treated as a series of positions, each of which is associated with a particular time. For example, if a first score $S_1$ occurs at time $T_1$, and a second score $S_2$ occurs at time $T_2$, the velocity V for this pair of scores may be computed as $(S_2-S_1)/(T_2-T_1)$.

The "time" values associated with scores may be identified in any of a variety of ways. For example, the time value of a particular score may be equal to or derived from the creation time of the user input (e.g., survey answers) from which the score was produced. As another example, each input (e.g., set of survey responses) received from a particular user with respect to a particular relationship partner of that user may be assigned sequential "time" values, e.g., 1, 2, 3, 4, independent of the chronological times at which those inputs were created or received.

Velocity may, however, be computed in other ways. For example, in some situations one may only be interested in whether a velocity is non-zero. In such a case, any non-zero velocity may be converted to a normalized value, such as 1. As another example, in some situations one may only be interested in whether a velocity is negative, zero, or positive. In such a case, negative velocities may be converted to a normalized value such as −1, zero velocities may remain zero, and positive velocities may be converted to a normalized value such as 1. These are merely examples of ways in which velocities may be computed.

Furthermore, any derivative of velocity, such as acceleration, may be computed based on the vocality/semantic analysis scores, and/or directly based on velocity or other derivatives of velocity. Therefore, any discussion of "velocity" herein should be understood to refer not only to velocity but also to acceleration and other derivates of velocity.

The method 1000 may, for example, identify for each user any one or more of the following: (1) a vocality velocity measurement based on the set of vocality scores for that user over time; (2) a latent semantic analysis velocity measurement based on the set of latent semantic analysis (e.g., emotivity) scores for that user over time; and (3) a combined velocity measurement based on both the vocality measurements and the latent semantic analysis measurements for that user over time. The combined velocity measurement may be calculated in any way, such as an average or weighted sum of the user's vocality velocity measurement and latent semantic analysis velocity measurement.

As another example, each of the user's vocality and latent semantic analysis measurements for a particular text may be combined together to produce a combined content measurement. The user's combined velocity measurement may then be calculated as the velocity of the user's combined content measurements.

The velocity measurement(s) associated with a particular user may be used for a variety of purposes. For example, a company or other relationship partner may be interested in knowing the velocities of the company's customers, so that the company may identify customers in need of attention.

For example, referring again to FIG. 10, the method 1000 may enter a loop over all user's U (step 1008). Assume for purposes of the following example that user U is a company. The method 1000 then enters a loop over each partner P of user U (step 1010). Assume for purposes of the following example that the partners P are customers of company U.

The method 1000 identifies a velocity of customer P with respect to company U (step 1012). The velocity identified in step 1012 may, for example, be any of the velocities described above with respect to steps 1006*a*-*c*.

If the velocity identified in step 1012 exceeds a predetermined threshold (step 1014), the method 1000 notifies company U of customer P's velocity (step 1016). Note that the threshold may be applied to the absolute value of the velocity, so that the company is notified of both large positive and large negative velocities. Furthermore, a function other than a simple threshold may be applied to the velocity to determine whether to notify the company of the velocity.

Alternatively, for example, the method 1000 may notify company U of the velocity of all customers, not just those customers whose velocities exceed a predetermined value. Furthermore, the notification performed in step 1016 may take any form. For example, it may include the value of customer P's velocity, or simply be a warning to company U that customer P requires attention.

Furthermore, the method 1000 may take into account the value of customer P's velocity when deciding which kind of notification to provide and/or which kind of action to take. For example, a customer whose vocality has a very high velocity may require more immediate attention than a customer with a lower velocity. The method 1000 may take this into account by prioritizing the customers P according to their velocities or functions thereof. For example, the method 1000 may instruct company U to attend to customer P within an amount of time that is derived from customer P's velocity, where larger velocities result in shorter amounts of time.

The method 1000 may repeat the process described above for the remaining customers of company U (step 1018) and for other companies (step 1020).

The techniques disclosed herein for measuring emotivity and vocality have a variety of advantages. For example, purely quantitative survey responses—such as "Rate your business partner on responsiveness on a scale of 1 through 5"—provide only limited information about the "loyalty climate" that characterizes the relationship between the survey respondent and the subject of the survey. A customer who responds with a value of 5 (highly satisfied) may still have little or no emotional attachment to his business partner. In fact, a respondent who responds with a value of 4 may feel more strongly about the business partner than someone who responds with a value of 5, yet such purely numerical responses fail to capture such subtle but important differences in loyalty climate.

The techniques disclosed herein can fill this gap in understanding by providing meaningful quantitative measures of respondents' feelings about their relationship partners, in the form of emotivity and vocality measurements. These measurements may be based on free text input provided by the respondents, and may therefore capture information which would otherwise go unrecognized solely by analyzing the respondents' numerical survey answers.

Although emotivity and vocality both measure intensity of feeling in some sense, they provide such measures in different ways that complement each other. Emotivity is based on semantic analysis of the words used by respondents, and therefore can capture very strong feelings expressed even in very few words. Vocality is based on the number of words used by respondents, and therefore can recognize strong feelings in respondents' responsive even when the individual words used by the respondents do not clearly indicate such feelings. Vocality is particularly useful as a complement to emotivity in light of the difficulty of performing semantic analysis of natural languages both automatically and accurately.

Identifying how strongly one partner to a relationship feels about the other partner is important because identification of such strength of feeling can be used as part of an overall process of identifying the loyalty of the first partner to the second partner. For example, the above-referenced patent application entitled, "Loyalty Measurement" discloses a system for calculating a loyalty index for a user based on a plurality of loyalty dimensions. Emotivity and vocality may be added as additional dimensions within such a system. Once emotivity scores are calculated for a population of users, the emotivity scores may be normalized to fit within the same range as scores in the other dimensions. The emotivity scores may then be weighted by a regression coefficient in the same manner as the other dimensions. Vocality may be integrated within the system in the same manner. Use of emotivity and/or vocality in this way may provide all of the benefits described in the "Loyalty Measurement" patent application.

One potential drawback of attempting to identify a person's strength of feeling, whether measured in terms of emotivity or vocality, based on textual input is that providing such textual input can be time-consuming. As a result, it may be difficult to obtain cooperation from users in providing such input. One advantage of embodiments of the present invention in this respect is that the textual input that is used to identify a user's emotivity and vocality scores may take the form of email messages, word processing documents, web pages, blogs, text messages, comment forms, transcribed phone conversations (such as customer service calls) and voicemail messages, and other text that the user has already written for other purposes. In other words, a user's emotivity and vocality scores may be calculated without requiring the user to write any additional text specifically for use in the emotivity and vocality measurements. The ability to calculate a user's emotivity and vocality scores based on existing documents also expands the amount of textual input that may be used to calculate such scores and thereby increases the accuracy of those scores.

Another benefit of certain embodiments of the present invention is that the "Emo list" 122*a*, which includes words representing strong emotions, is not selected arbitrarily or by reference to any predetermined source of words (such as a dictionary or thesaurus), but rather is selected by identifying words used by users having very high and very low loyalty levels. As a result, the Emo list may contain words which reflect strong emotions, but which may not have dictionary definitions representing strong emotions, or which would not otherwise have been identified as "strong emotion" words. Since a word will be included on the Emo list if that word is used by high-loyalty and low-loyalty users, but not by middle-loyalty users, the Emo list is likely to include the words used by passionate users within a particular community. As a result, calculating each user's emotivity score based at least in part on the contents of the Emo list enables the emotivity score to reflect more accurately how emotive each user is in relation to other members of the community, not just in relation to predetermined (and possibly incorrect) notions of which words reflect strong emotions.

At the same time, the use of both the Emo list—which is generated based on words used within the community—and the positive and negative lists—which are generated based on dictionary definitions of words—ensures that the emotivity score is not unduly influenced either by unusual usages of words within the community or by predetermined notions of which words reflect strong emotions. Furthermore, the relative influence of the words in the Emo list 122*a*, positive list 122*b*, and negative list 122*c* need not be determined arbitrarily. Rather, the techniques disclosed above with respect to FIGS. 1 and 2 may be used to assign weights A, B, and C in Equation 1 based on input provided by users 106. In this way, the weights A, B, and C may be chosen to reflect the actual relationship between strong-emotion words, positive-emotion words, and negative-emotion words, respectively, on loyalty. For example, based on one set of data we have identified the values of 10, 1, and −15 for coefficients A, B, and C, respectively, reflecting the strong relationship between the use of negative words on loyalty. Calibrating the emotivity coefficients based on statistical analysis of empirical data in this way enables the emotivity scores generated by embodiments of the present invention to more accurately reflect users' emotivity.

Another benefit of certain embodiments of the present invention is that they may be used to identify the velocity of user's vocalities. It may be useful to identify such velocities because the raw vocality of a user, while helpful, may provide limited information about the user. For example, if a particular user's baseline vocality is relatively high and then begins to drop over time to lower and lower values, this downward trend may be evidence that the user's loyalty is decreasing, or that the user is otherwise in need of attention. The user's new, lower, vocality scores, however, may still be relatively high compared to the vocality scores of other users or compared to some other baseline value. Merely analyzing individual vocality scores of the user, therefore, may fail to indicate that the user is in need of attention. In contrast, analyzing a sequence of the user's vocality scores over time and identifying the velocity of such scores may enable the system to draw conclusions and take actions, regardless of the absolute values of such scores.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Although in certain embodiments disclosed herein, both emotivity and vocality are represented as single numbers (such as the emotivity score 512 n FIG. 5 and the vocality score 712 in FIG. 7), this is not a limitation of the present invention. Rather, emotivity and vocality may be represented in other ways, such as by multiple values.

Although particular techniques are disclosed herein for generating the Emo list 122a, positive list 122b, and negative list 122c, such lists may be generated in other ways. Furthermore, such lists 122a-c may be updated over time. For example, the Emo list 122a may be updated as additional free-text responses are received from users who loyalty levels are already known. For example, if text is received from a person having a loyalty level of −1 or 3, then any words used by that person may be added to the Emo list 122a, so long as those words are not in the "non-emotive" list 320b. As another example, the system 100 may scan emails within a corporation and continuously update the Emo list 122a based on words within emails sent by senders whose loyalty levels are already known.

Although in the example illustrated in FIGS. 7 and 8A-8C, the statistics 720a-720e are means and standard deviations, other statistics may be used in the process of measuring vocality. For example, other kinds of averages, such as modes or medians, may be used. Furthermore, in FIGS. 8A-8C, a single standard deviation serves as the breakpoint between different vocality levels. This is merely one example, however, and does not constitute a limitation of the present invention. Any breakpoint(s) between different vocality levels may be used.

The techniques described above may be implemented, for example, in hardware, software tangibly embodied in a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by a computer processor executing computer program instructions stored on a non-transitory computer-readable medium, the method comprising:
   (A) providing a survey to a plurality of people, the survey comprising a plurality of questions;
   (B) receiving, from the plurality of people, a plurality of sets of answers to the plurality of questions;
   (C) identifying a plurality of loyalty indices of the plurality of people based on the plurality of sets of answers;
   (D) for each of the plurality of people U:
      (D)(1) identifying text input T associated with person U;
      (D)(2) identifying a count E of words in text input T which are in a predetermined list of words representing strong emotions;
      (D)(3) identifying a count P of words in text input T which are in a predetermined list of words representing positive emotions;
      (D)(4) identifying a count N of words in text input T which are in a predetermined list of words representing negative emotions; and
   (E) selecting values of coefficients A, B, and C that maximize a value of $R^2$ between the plurality of loyalty indices and values of a variable Emo for the plurality of people, wherein Emo=A*E+B*P+C*N.

2. A method performed by a computer processor executing computer program instructions stored on a non-transitory computer-readable medium, the method comprising:
(A) identifying a plurality of loyalty levels of a plurality of people;
(B) identifying a plurality of text inputs provided by the plurality of people;
(C) identifying a first subset of the plurality of people having loyalty levels satisfying a high loyalty level criterion;
(D) identifying a second subset of the plurality of people having loyalty levels satisfying a low loyalty level criterion;
(E) identifying a third subset of the plurality of people having loyalty levels not satisfying the high loyalty level criterion or the low loyalty level criterion;
(F) identifying a first subset of the plurality of text inputs comprising text inputs provided by the first subset of the plurality of people and text inputs provided by the second subset of the plurality of people;
(G) identifying a second subset of the plurality of text inputs comprising text inputs provided by the second subset of the plurality of people; and
(H) identifying a third subset of the plurality of text inputs comprising the relative complement of the second subset of the plurality of text inputs relative to the first subset of the plurality of text inputs.

3. The method of claim 2, wherein (A) comprises:
(A)(1) providing a survey to the plurality of people, the survey comprising a plurality of questions;
(A)(2) receiving, from the plurality of people, a plurality of sets of answers to the plurality of questions; and
(A)(3) identifying the plurality of loyalty levels based on the plurality of sets of answers.

4. The method of claim 3, wherein the plurality of sets of answers comprises the plurality of text inputs.

5. The method of claim 2, further comprising:
(I) identifying a predetermined list of words representing positive emotions;
(J) identifying a predetermined list of words representing negative emotions;
(K) identifying text input T associated with a person;
(L) identifying a count E of words in text input T which are in the third subset of the plurality of text inputs;
(M) identifying a count P of words in text input T which are in the predetermined list of words representing positive emotions;
(N) identifying a count N of words in text input T which are in the predetermined list of words representing negative emotions; and
(O) identifying a value representing an emotional content of text input T based on E, P, and N.

6. The method of claim 5, wherein (O) comprises identifying the value representing the emotional content of text input T based on a linear weighting of E, P, and N.

7. The method of claim 5, wherein (I) comprises:
(I)(1) identifying an initial predetermined list of words representing positive emotions;
(I)(2) expanding the initial predetermined list of words to include synonyms of the initial set of words; and
(I)(3) identifying the expanded initial predetermined list of words as the set of words representing positive emotions.

8. The method of claim 5, wherein (J) comprises:
(J)(1) identifying an initial predetermined list of words representing negative emotions;
(J)(2) expanding the initial predetermined list of words to include synonyms of the initial predetermined list of words; and
(J)(3) identifying the expanded initial predetermined list of words as the predetermined list of words representing negative emotions.

9. The method of claim 5, wherein the person associated with the text input T is one of the plurality of people, and wherein (K) comprises identifying the text input T within the plurality of text inputs provided by the plurality of people.

10. The method of claim 5, wherein (K) comprises identifying the text input T within an email message.

11. The method of claim 5, wherein (K) comprises identifying the text input T within a web page.

12. A method performed by a computer processor executing computer program instructions stored on a non-transitory computer-readable medium, the method comprising:
(A) identifying a predetermined list of words representing strong emotions;
(B) identifying a predetermined list of words representing positive emotions;
(C) identifying a predetermined list of words representing negative emotions;
(D) identifying first text input $I_1$ associated with a person;
(E) identifying a first count $E_1$ of the strong emotion words in text input $T_1$;
(F) identifying a first count $P_1$ of the positive emotion words in text input $T_1$;
(G) identifying a first count $N_1$ of the negative emotion words in text input $I_1$; and
(H) identifying a first value $V_1$ representing an emotional content of text input $I_1$ based on $E_1$, $P_1$, and $N_1$.

13. The method of claim 12, further comprising:
(I) identifying a first time $T_1$ associated with text input $I_1$;
(J) identifying second text input $I_2$ associated with the person;
(K) identifying a second time $T_2$ associated with text input $I_2$;
(L) identifying a second count $E_2$ of the strong emotion words in text input $I_2$;
(M) identifying a second count $P_2$ of the positive emotion words in text input $I_2$;
(N) identifying a second count $N_2$ of the negative emotion words in text input $I_2$;
(O) identifying a second value $V_2$ representing an emotional content of text input $I_2$ based on $E_2$, $P_2$, and $N_2$; and
(P) identifying a velocity associated with the person $(V_2-V_1)/(T_2-T_1)$.

14. A method performed by a computer processor executing computer program instructions stored on a non-transitory computer-readable medium, the method comprising:
(A) receiving, from a plurality of people, a plurality of text inputs having a plurality of sizes;
(B) identifying a statistic derived from the plurality of sizes;
(C) selecting one of the plurality of text inputs $I_1$ from one of the plurality of people P;
(D) identifying a size of text input $I_1$; and
(E) selecting a measurement $V_1$ associated with person P based on the size of text input $I_1$ and the statistic derived from the plurality of sizes.

15. The method of claim 14, further comprising:
(F) prior to (E), identifying a loyalty level of person P; and
wherein (E) comprises selecting a measurement associated with person P based on the size of text input $I_1$, the statistic derived from the plurality of sizes, and the loyalty level of person P.

16. The method of claim 15, further comprising:
(G) modifying the loyalty level of the person P based on the measurement associated with person P.

17. The method of claim 14, wherein the statistic in an average of the plurality of sizes.

18. The method of claim 17, wherein the average is a mean.

19. The method of claim 18, wherein (E) comprises:
(E)(1) if the size of text input $I_1$ is greater than the mean plus one standard deviation, then selecting a first value for the measurement associated with person P; and
(E)(2) otherwise, selecting a second value for the measurement associated with person P.

20. The method of claim 14, wherein the plurality of sizes comprises a plurality of numbers of words.

21. The method of claim 14, wherein (A) comprises:
(A)(1) providing a survey to the plurality of people, the survey comprising a plurality of questions; and
(A)(2) receiving, from the plurality of people, a plurality of sets of answers to the plurality of questions.

22. The method of claim 14, further comprising:
(F) identifying a first time $T_1$ associated with text input $I_1$;
(G) selecting one of the plurality of text inputs $I_2$ from person P;
(H) identifying a size of text input $I_2$;
(I) identifying a second time $T_2$ associated with text input $I_2$;
(J) selecting a measurement $V_2$ associated with person P based on the size of text input $I_2$ and the statistic derived from the plurality of sizes; and
(K) identifying a velocity associated with the person P based on text input $I_1$, time $T_1$, second text input $I_2$, and time $T_2$.

23. A method performed by a computer processor executing computer program instructions stored on a non-transitory computer-readable medium, the method comprising:
(A) identifying text input T associated with a person;
(B) counting a number of words W in the text input T;
(C) providing, on an output device, a visual representation of W, comprising:
(C)(1) identifying a range of values encompassing W; and
(C)(2) identifying a visual representation corresponding to the range of values.

24. The method of claim 23, wherein (C)(1) the range of values is one of a plurality of ranges of values, wherein the plurality of ranges of values correspond to a plurality of visual representations.

25. A computer-readable medium having tangibly stored thereon computer-readable instructions, wherein the computer-readable instructions are executable by a processor to perform a method comprising:
(A) providing a survey to a plurality of people, the survey comprising a plurality of questions;
(B) receiving, from the plurality of people, a plurality of sets of answers to the plurality of questions;
(C) identifying a plurality of loyalty indices of the plurality of people based on the plurality of sets of answers;
(D) for each of the plurality of people U:
(D)(1) identifying text input T associated with person U;
(D)(2) identifying a count E of words in text input T which are in a predetermined list of words representing strong emotions;
(D)(3) identifying a count P of words in text input T which are in a predetermined list of words representing positive emotions;
(D)(4) identifying a count N of words in text input T which are in a predetermined list of words representing negative emotions; and
(E) selecting values of coefficients A, B, and C that maximize a value of $R^2$ between the plurality of loyalty indices and values of a variable Emo for the plurality of people, wherein Emo=A*E+B*P+C*N.

26. A computer-readable medium having tangibly stored thereon computer-readable instructions, wherein the computer-readable instructions are executable by a processor to perform a method comprising:
(A) identifying a plurality of loyalty levels of a plurality of people;
(B) identifying a plurality of text inputs provided by the plurality of people;
(C) identifying a first subset of the plurality of people having loyalty levels satisfying a high loyalty level criterion;
(D) identifying a second subset of the plurality of people having loyalty levels satisfying a low loyalty level criterion;
(E) identifying a third subset of the plurality of people having loyalty levels not satisfying the high loyalty level criterion or the low loyalty level criterion;
(F) identifying a first subset of the plurality of text inputs comprising text inputs provided by the first subset of the plurality of people and text inputs provided by the second subset of the plurality of people;
(G) identifying a second subset of the plurality of text inputs comprising text inputs provided by the second subset of the plurality of people; and
(H) identifying a third subset of the plurality of text inputs comprising the relative complement of the second subset of the plurality of text inputs relative to the first subset of the plurality of text inputs.

27. The computer-readable medium of claim 26, wherein (A) comprises:
(A)(4) providing a survey to the plurality of people, the survey comprising a plurality of questions;
(A)(5) receiving, from the plurality of people, a plurality of sets of answers to the plurality of questions; and
(A)(6) identifying the plurality of loyalty levels based on the plurality of sets of answers.

28. The computer-readable medium of claim 27, wherein the plurality of sets of answers comprises the plurality of text inputs.

29. The computer-readable medium of claim 26, further comprising:
(I) identifying a predetermined list of words representing positive emotions;
(J) identifying a predetermined list of words representing negative emotions;
(K) identifying text input T associated with a person;
(L) identifying a count E of words in text input T which are in the third subset of the plurality of text inputs;
(M) identifying a count P of words in text input T which are in the predetermined list of words representing positive emotions;

(N) identifying a count N of words in text input T which are in the predetermined list of words representing negative emotions; and
(O) identifying a value representing an emotional content of text input T based on E, P, and N.

30. The computer-readable medium of claim 29, wherein (O) comprises identifying the value representing the emotional content of text input T based on a linear weighting of E, P, and N.

31. The computer-readable medium of claim 29, wherein (I) comprises:
 (I)(1) identifying an initial predetermined list of words representing positive emotions;
 (I)(2) expanding the initial predetermined list of words to include synonyms of the initial predetermined list of words; and
 (I)(3) identifying the expanded initial predetermined list of words as the predetermined list of words representing positive emotions.

32. The computer-readable medium of claim 29, wherein (J) comprises:
 (J)(1) identifying an initial predetermined list of words representing negative emotions;
 (J)(2) expanding the initial predetermined list of words to include synonyms of the initial predetermined list of words; and
 (J)(3) identifying the expanded initial predetermined list of words as the predetermined list of words representing negative emotions.

33. The computer-readable medium of claim 29, wherein the person associated with the text input T is one of the plurality of people, and wherein (K) comprises identifying the text input T within the plurality of text inputs provided by the plurality of people.

34. The computer-readable medium of claim 29, wherein (K) comprises identifying the text input T within an email message.

35. The computer-readable medium of claim 29, wherein (K) comprises identifying the text input T within a web page.

36. A computer-readable medium having tangibly stored thereon computer-readable instructions, wherein the computer-readable instructions are executable by a processor to perform a method comprising:
 (A) identifying a predetermined list of words representing strong emotions;
 (B) identifying a predetermined list of words representing positive emotions;
 (C) identifying a predetermined list of words representing negative emotions;
 (D) identifying first text input $I_1$ associated with a person;
 (E) identifying a first count $E_1$ of the strong emotion words in text input $I_1$;
 (F) identifying a first count $P_1$ of the positive emotion words in text input $I_1$;
 (G) identifying a first count $N_1$ of the negative emotion words in text input $I_1$; and
 (H) identifying a first value $V_1$ representing an emotional content of text input $I_1$ based on $E_1$, $P_1$, and $N_1$.

37. The computer-readable medium of claim 36, further comprising:
 (I) identifying a first time $T_1$ associated with text input $I_1$;
 (J) identifying second text input $I_1$ associated with the person;
 (K) identifying a second time $T_2$ associated with text input $I_2$;
 (L) identifying a second count $E_2$ of the strong emotion words in text input $I_2$;
 (M) identifying a second count $P_2$ of the positive emotion words in text input $I_2$;
 (N) identifying a second count $N_2$ of the negative emotion words in text input $I_2$;
 (O) identifying a second value $V_2$ representing an emotional content of text input $I_2$ based on $E_2$, $P_2$, and $N_2$; and
 (P) identifying a velocity associated with the person as $(V_2-V_1)/(T_2-T_1)$.

38. A computer-readable medium having tangibly stored thereon computer-readable instructions, wherein the computer-readable instructions are executable by a processor to perform a method comprising:
 (A) receiving, from a plurality of people, a plurality of text inputs having a plurality of sizes;
 (B) identifying a statistic derived from the plurality of sizes;
 (C) selecting one of the plurality of text inputs $I_1$ from one of the plurality of people P;
 (D) identifying a size of text input $I_1$; and
 (E) selecting a measurement $V_1$ associated with person P based on the size of text input $I_1$ and the statistic derived from the plurality of sizes.

39. The computer-readable medium of claim 38, further comprising:
 (F) prior to (E), identifying a loyalty level of person P; and wherein (E) comprises selecting a measurement associated with person P based on the size of text input $I_1$, the statistic derived from the plurality of sizes, and the loyalty level of person P.

40. The computer-readable medium of claim 39, further comprising:
 (G) modifying the loyalty level of the person P based on the measurement associated with person P.

41. The computer-readable medium of claim 38, wherein the statistic in an average of the plurality of sizes.

42. The computer-readable medium of claim 41, wherein the average is a mean.

43. The computer-readable medium of claim 42, wherein (E) comprises:
 (E)(1) if the size of text input I1 is greater than the mean plus one standard deviation, then selecting a first value for the measurement associated with person P; and
 (E)(2) otherwise, selecting a second value for the measurement associated with person P.

44. The computer-readable medium of claim 38, wherein the plurality of sizes comprises a plurality of numbers of words.

45. The computer-readable medium of claim 38, wherein (A) comprises:
 (A)(1) providing a survey to the plurality of people, the survey comprising a plurality of questions; and
 (A)(2) receiving, from the plurality of people, a plurality of sets of answers to the plurality of questions.

46. The computer-readable medium of claim 38, further comprising:
 (F) identifying a first time $T_1$ associated with text input $I_1$;
 (G) selecting one of the plurality of text inputs $I_2$ from person P;
 (H) identifying a size of text input I2;
 (I) identifying a second time $T_2$ associated with text input $I_2$;
 (J) selecting a measurement $V_2$ associated with person P based on the size of text input $I_2$ and the statistic derived from the plurality of sizes; and (K) identifying a velocity associated with the person P based on text input $I_1$, time $T_1$, second text input $I_2$, and $T_2$.

47. A computer-readable medium having tangibly stored thereon computer-readable instructions, wherein the computer-readable instructions are executable by a processor to perform a method comprising:
- (A) identifying text input T associated with a person;
- (B) counting a number of words W in the text input T;
- (C) providing, on an output device, a visual representation of W, comprising:
  - (C)(1) identifying a range of values encompassing W; and
  - (C)(2) identifying a visual representation corresponding to the range of values.

48. The computer-readable medium of claim 47, wherein the range of values is one of a plurality of ranges of values, wherein the plurality of ranges of values correspond to a plurality of visual representations.

* * * * *

UNITED STATES PATENT AND TRADEMARK OFFICE
CERTIFICATE OF CORRECTION

PATENT NO. : 8,438,037 B2
APPLICATION NO. : 12/758349
DATED : May 7, 2013
INVENTOR(S) : Thomas M. Cates et al.

Page 1 of 1

It is certified that error appears in the above-identified patent and that said Letters Patent is hereby corrected as shown below:

On Title page 2, under "OTHER PUBLICATIONS", in column 2, line 12-13, delete "Phycological" and insert -- Psychological --, therefor.

In the Claims

In column 20, line 53, In Claim 13, after "person" insert -- as --.

In column 24, line 43, In Claim 43, delete "I1" and insert -- l1 --, therefor.

In column 24, line 62, In Claim 46, delete "I2;" and insert -- l2; --, therefor.

Signed and Sealed this
Sixth Day of August, 2013

Teresa Stanek Rea
*Acting Director of the United States Patent and Trademark Office*